US009806341B2

United States Patent
Lee et al.

(10) Patent No.: US 9,806,341 B2
(45) Date of Patent: Oct. 31, 2017

(54) POSITIVE ACTIVE MATERIAL, POSITIVE ELECTRODE INCLUDING THE SAME, AND LITHIUM SECONDARY BATTERY INCLUDING THE POSITIVE ELECTRODE

(71) Applicant: Samsung SDI Co., Ltd., Yongin-si, Gyeonggi-do (KR)

(72) Inventors: Daehoe Lee, Yongin-si (KR); Sangwoo Cho, Yongin-si (KR); Sooyoun Park, Yongin-si (KR); Changwook Kim, Yongin-si (KR); Dohyung Park, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/707,986

(22) Filed: May 8, 2015

(65) Prior Publication Data
US 2016/0156032 A1    Jun. 2, 2016

(30) Foreign Application Priority Data

Nov. 28, 2014    (KR) ........................ 10-2014-0169134

(51) Int. Cl.
*H01M 4/525*    (2010.01)
*C01G 51/00*    (2006.01)
*H01M 4/505*    (2010.01)
*H01M 10/052*    (2010.01)
*H01M 4/02*    (2006.01)

(52) U.S. Cl.
CPC ............ *H01M 4/525* (2013.01); *C01G 51/42* (2013.01); *C01G 51/66* (2013.01); *H01M 4/505* (2013.01); *H01M 10/052* (2013.01); *C01P 2002/50* (2013.01); *C01P 2002/52* (2013.01); *C01P 2002/72* (2013.01); *C01P 2002/77* (2013.01); *C01P 2004/03* (2013.01); *C01P 2004/51* (2013.01); *C01P 2004/61* (2013.01); *C01P 2006/40* (2013.01); *H01M 2004/028* (2013.01)

(58) Field of Classification Search
CPC .................................................... C01G 51/66
See application file for complete search history.

(56) References Cited

U.S. PATENT DOCUMENTS

| 2002/0098416 A1 | 7/2002 | Maeda et al. |
| 2004/0048158 A1 | 3/2004 | Okochi et al. |
| 2006/0222951 A1 | 10/2006 | Tatsumi et al. |
| 2008/0213665 A1 | 9/2008 | Nishida et al. |

FOREIGN PATENT DOCUMENTS

| JP | 2008071623 A | * | 3/2008 |
| JP | 4150343 B2 | | 7/2008 |
| JP | 4479874 B2 | | 3/2010 |
| JP | 5052161 B2 | | 8/2012 |
| KR | 10-2001-0081002 A | | 8/2001 |
| KR | 10-0734595 B1 | | 6/2007 |
| WO | WO 00/29331 A1 | | 5/2000 |

OTHER PUBLICATIONS

English abstract of JP 2008071623 A (2008).*
Reimers, Jan N. et al., "Electrochemical and In Situ X-Ray Diffraction Studies of Lithium Intercalation in LixCoO2," *J. Electrochem. Soc.*, vol. 139, No. 8, Aug. 1992, pp. 2091-2097.
Van der Ven, Anton et al., "First-Principles Evidence for Stage Ordering in $Li_xCoO_2$," *J. Electrochem. Soc.*, vol. 145, No. 6, Jun. 1998, pp. 2149-2155.
Park, Jungki, "Principles and Applications of Lithium Secondary Batteries," Hongrung Publishing Company, Republic of Korea, 2010, p. 44.
Rietveld, H. M. "A Profile Refinement Method for Nuclear and Magnetic Structures," *J. Appl. Cryst.* (1969) 2, 65, pp. 65-71.

* cited by examiner

Primary Examiner — Peter F Godenschwager
(74) Attorney, Agent, or Firm — Knobbe, Martens, Olson & Bear, LLP

(57) ABSTRACT

Provided are a positive active material, a positive electrode including the same, and a lithium secondary battery including the positive electrode. The positive active material includes lithium cobalt oxide containing a metal element, and the lithium cobalt oxide containing a metal element has a ratio of a peak intensity of the O3 phase to a peak intensity of the H1-3 phase, $I_{O3}/I_{H1-3}$, that is greater than 1 in a X-ray diffraction (XRD) analysis spectrum using Cu-Kα radiation. Accordingly, a lithium secondary battery including the positive active material may have improved lifespan characteristics even at a high voltage.

12 Claims, 26 Drawing Sheets

POSITIVE ACTIVE MATERIAL, POSITIVE ELECTRODE INCLUDING THE SAME, AND LITHIUM SECONDARY BATTERY INCLUDING THE POSITIVE ELECTRODE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims the benefit of Korean Patent Application No. 10-2014-0169134, filed on Nov. 28, 2014, in the Korean Intellectual Property Office, the disclosure of which is incorporated herein in its entirety by reference.

BACKGROUND

Field

One or more exemplary embodiments of the present disclosure relate to a positive active material, a positive electrode including the same, and a lithium secondary battery including the positive electrode.

Description of the Related Technology

With the advances in the field of small high-tech devices such as digital cameras, mobile devices, laptops, and personal computers, there has been a sharp increase in demand for lithium batteries as energy sources. With the spread of electric cars, including hybrid electric vehicles (HEVs), plug-in hybrid electric vehicles (PHEVs), and electric vehicles (EVs), safe lithium batteries for these electric vehicles are under development.

Various positive active materials are currently being studied to develop a lithium battery that is suitable for the purposes described above.

As a positive active material for a lithium secondary battery, a single-component lithium cobalt oxide ($LiCoO_2$) is primarily used; however, use of a lithium composite metal oxide ($Li(Ni-Co-Mn)O_2$, $Li(Ni-Co-Al)O_2$, or the like) having a layered structure and high capacity has been increasing. Also, a spinel-type lithium manganese oxide ($LiMn_2O_4$) and an olivine-type iron phosphate lithium oxide ($LiFePO_4$) having high safety features are receiving attention.

In particular, there has been a demand for the development of a positive active material for a lithium secondary battery, which has excellent lifespan characteristics even at a high voltage.

SUMMARY

Some embodiments include a positive active material for a lithium secondary battery, which includes lithium cobalt oxide containing a metal element and suppresses a phase transition in which the lifespan characteristics of the lithium secondary battery may be degraded.

Some embodiments include a positive electrode including the positive active material.

Some embodiments include a lithium battery including the positive electrode, thereby having an increased lifespan.

Additional embodiments will be set forth in part in the description which follows and, in part, will be apparent from the description, or may be learned by practice of the presented embodiments.

According to an aspect of one or more exemplary embodiments, a positive active material for a lithium secondary battery includes lithium cobalt oxide containing a metal element, wherein the lithium cobalt oxide containing a metal element has a ratio of a peak intensity of an O3 phase to a peak intensity of an H1-3 phase, $I_{O3}/I_{H1-3}$, that is greater than 1 in an X-ray diffraction (XRD) analysis spectrum using Cu-Kα radiation.

According to an embodiment, the $I_{O3}/I_{H1-3}$ is greater than 1.0 and equal to or less than 5.0.

According to an embodiment, the metal element may be placed in a site of the cobalt in a crystal lattice of the lithium cobalt oxide.

According to an embodiment, the lithium cobalt oxide containing a metal element may not include a spinel compound.

According to an embodiment, the metal element may be at least one element selected from a group consisting of magnesium (Mg), manganese (Mn), nickel (Ni), aluminum (Al), titanium (Ti), calcium (Ca), iron (Fe), copper (Cu), and zinc (Zn).

According to an embodiment, the lithium cobalt oxide may include two or more metal elements.

According to an embodiment, the metal element may include Mg and Mn.

According to an embodiment, the metal element may have an oxidation number of 2 or 3.

According to an embodiment, the lithium cobalt oxide containing a metal element may be represented by Formula 1 below:

$$Li_a(Co_{1.0-x-y}Mg_xMn_y)O_2 \qquad \text{Formula 1}$$

wherein, in Formula 1,
0.8≤a≤1.2, 0.0025≤x≤0.005, and 0.001≤y≤0.0075.

According to an embodiment, the lithium cobalt oxide containing a metal element may be $Li(Co_{0.9965}Mg_{0.0025}Mn_{0.001})O_2$, $Li(Co_{0.995}Mg_{0.0025}Mn_{0.0025})O_2$, $Li(Co_{0.9925}Mg_{0.0025}Mn_{0.005})O_2$, $Li(Co_{0.99}Mg_{0.0025}Mn_{0.0075})O_2$, $Li(Co_{0.994}Mg_{0.005}Mn_{0.001})O_2$, $Li(Co_{0.9925}Mg_{0.005}Mn_{0.0025})O_2$, $Li(Co_{0.99}Mg_{0.005}Mn_{0.005})O_2$, $Li(Co_{0.9875}Mg_{0.005}Mn_{0.0075})O_2$, or a combination thereof.

According to an embodiment, an average oxidation number N of a metal element contained in the lithium cobalt oxide may be in a range of about 2.1 to about 2.75.

According to an embodiment, a c-axis lattice parameter of a unit lattice in the lithium cobalt oxide containing a metal element may be 14.050 Å or more.

According to an embodiment, an average particle diameter D50 of the lithium cobalt oxide containing a metal element may be in a range of about 1 μm to about 50 μm.

According to some embodiments, a positive electrode for a lithium secondary battery includes a positive active material.

According to some embodiments, a lithium secondary battery includes the positive electrode.

According to an embodiment, a charging cutoff voltage of the lithium secondary battery may be 4.5 V or more.

According to an embodiment, after charging is completed, a lithium cobalt oxide containing a metal element and included in the positive electrode may have a ratio of a peak intensity of the O3 phase to a peak intensity of the H1-3 phase, $I_{O3}/I_{H1-3}$, that is greater than 1 in an XRD analysis spectrum using Cu-Kα radiation.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
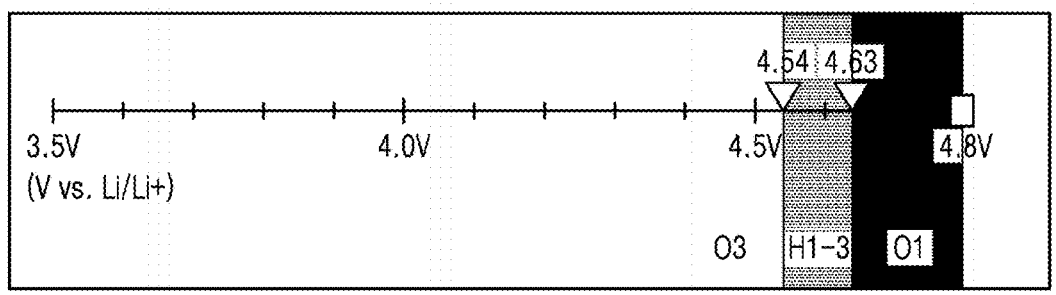
FIG. 1 is a view showing a phase transition of $LiCoO_2$ according to a charging voltage.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description.

In general, a lithium cobalt oxide, for example, $LiCoO_2$, has an R-3m rhombohedral layered structure. In detail, the lithium cobalt oxide has a structure in which lithium, cobalt, and oxygen are regularly arranged in the form of O—Li—O—Co—O—Li—O—Co—O along a [111] crystal face of a rock salt structure and such a structure is also referred to as an O3-type layered structure.

If the lithium cobalt oxide is included in a positive active material, lithium ions are deintercalated from a crystal lattice of the lithium cobalt oxide when a lithium secondary battery including the positive active material is charged. In particular, as the charging voltage increases, in detail, as the charging cutoff voltage increases, the amount of lithium ions deintercalated from a crystal lattice of the lithium cobalt oxide increases. Accordingly, as a charging cutoff voltage increases, a phase transition likely occurs in a layered structure of the lithium cobalt oxide due to a change in a crystal lattice structure.

FIG. 1 shows a phase transition of $LiCoO_2$ according to a charging voltage of a lithium secondary battery. (Note. *J. Electrochem. Soc.*, 139, 2091 (1992) and *J. Electrochem. Soc.*, 145, 2149 (1998)). As shown in FIG. 1, for lithium, an O3-type layered structure (O3 phase) may be maintained up to a charging voltage of 4.54 V after charging is completed. However, when a charging voltage is 4.63 V or more, the amount of lithium ions deintercalated from a crystal lattice of the lithium cobalt oxide increases, and thus, a phase transition from the O3-type layered structure to an O1-type layered structure (O1 phase), in which Li is not present in a crystal lattice, may occur. In this regard, a main phase may be an O1 phase in a range of about 4.63 V to an upper limit voltage of 4.8 V at which reversible intercalation/deintercalation of lithium ions is impossible. When the charging voltage is in a range of about 4.54 V to about 4.63 V, a phase transition from the O3-type layered structure to an H1-3-type layered structure (H1-3 phase) may occur, in which an O3-type layered structure and an O1-type layered structure coexist in a crystal lattice. Accordingly, when the charging voltage is in a range of about 4.54 V to about 4.63 V, a main phase may be an H1-3 phase.

Figure 2:
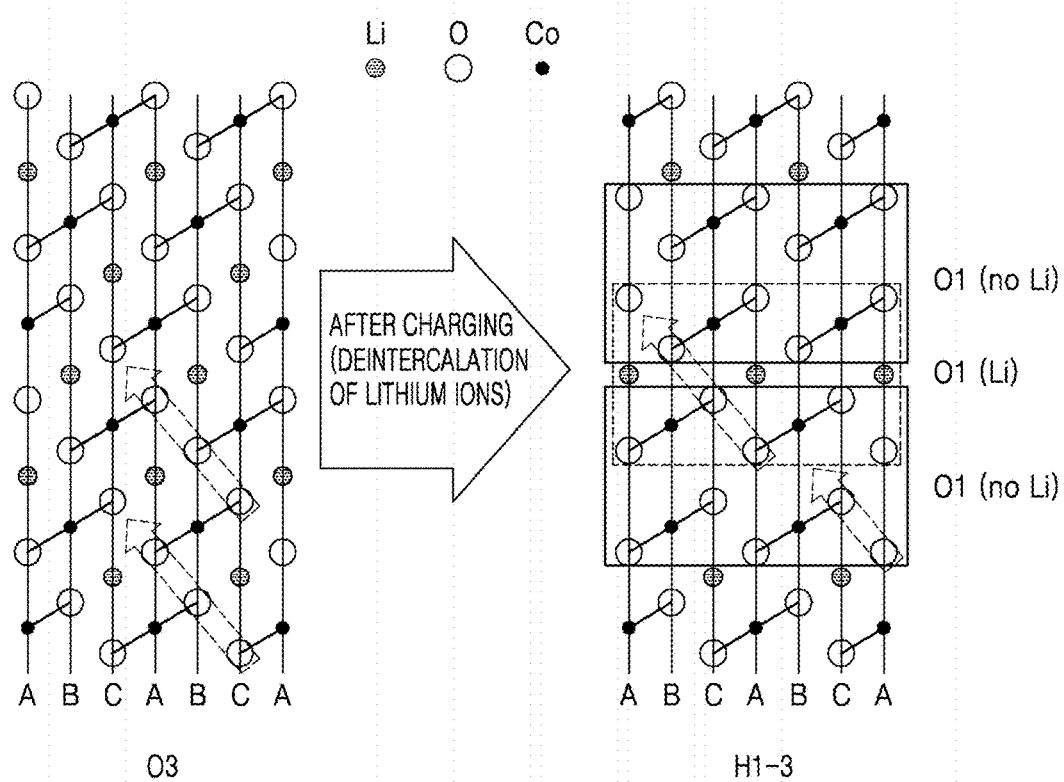
FIG. 2 is a view showing a phase transition from an O3 phase to an H1-3 phase after a lithium secondary battery is charged.

FIG. 2 shows a phase transition from the O3 phase to the H1-3 phase according to deintercalation of lithium ions after a lithium secondary battery is charged. Dashed arrows in FIG. 2 denote a stacking sequence of oxygen. In detail, an O3-type layered structure has three oxygens in a row diagonally, and an O1-type layered structure has two oxygens in a row diagonally. As shown in FIG. 2, as more lithium ions are intercalated, a phase transition to an H1-3-type layered structure may occur, in which an O3-type layered structure (Li in a crystal lattice) and an O1-type layered structure (no Li in a crystal lattice) coexist.

Figure 3:
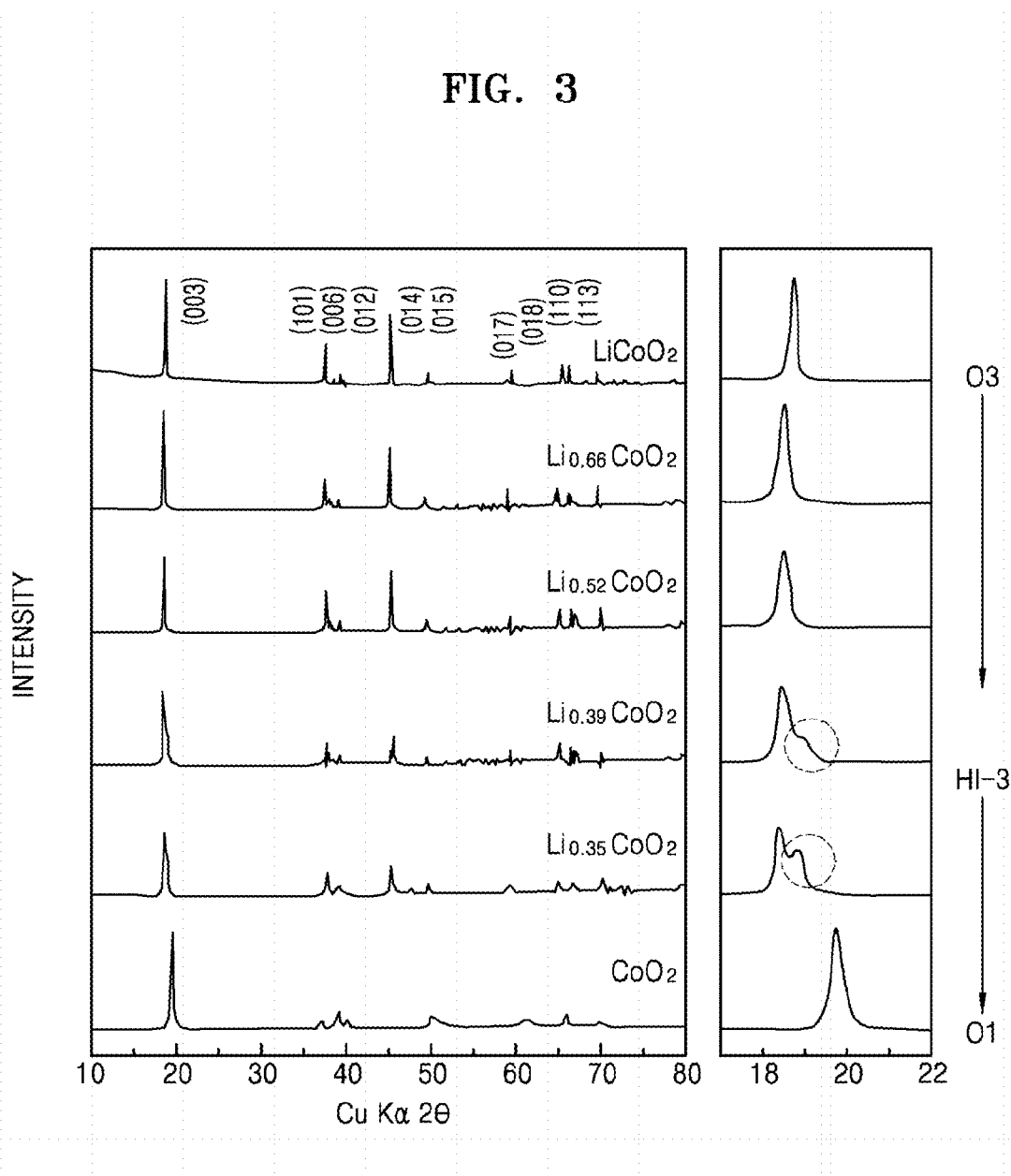
FIG. 3 is a view showing an X-ray diffraction (XRD) analysis result of $Li_{1-x}CoO_2$ according to changes in lithium ion amounts.

Also, FIG. 3 is a view showing a X-ray diffraction (XRD) analysis result of $Li_{1-x}CoO_2$ according to changes in lithium ion amount. (Note. From 'Principles and Applications of Lithium Secondary Batteries', p. 44, FIG. 3.1.12, Hongrung Publishing Company) In FIG. 3, (003), (101), (006), (012), (104), (015), (107), (018), (110) and (113) indicate crystal planes of $Li_{1-x}CoO_2$ phase. As shown in FIG. 3, the O3 phase may have a peak around $18°<2\theta<18.7°$, and the H1-3 phase may have a peak around $18.7°<2\theta<19.5°$. As lithium amounts in the lithium cobalt oxide decreases, a phase transition occurs, and thus, a peak intensity of the O3 phase decreases while a peak intensity of the H1-3 phase (referring to dashed circle) increases. In the XRD analysis spectrum of $CoO_2$ having no Li, there may be no peaks of the O3 phase and the H1-3 phase and there may only be a peak of the O1 phase.

Phase transitions from the O3-type layered structure to an H1-3-type layered structure and from the O3-type layered structure to an O1-type layered structure may be partially irreversible, and in the H1-3-type layered structure and the O1-type layered structure, lithium ions capable of being intercalated/deintercalated may decrease. Thus, when the phase transition occurs, the lifespan characteristics of the lithium secondary battery may deteriorate. In this regard, a phase transition of lithium cobalt oxide needs to be suppressed so that the lifespan characteristics of a lithium battery are improved at a high voltage that is more than 4.54 V.

In order to address the problems described above, when lithium cobalt oxide is doped with a metal element, a phase transition from the O3 phase to the H1-3 phase at a high voltage may be suppressed.

For example, a positive active material according to an aspect includes the lithium cobalt oxide containing a metal element, wherein the lithium cobalt oxide containing a metal element has a ratio of a peak intensity of the O3 phase to a peak intensity of the H1-3 phase (hereinafter, referred to as $I_{O3}/I_{H1-3}$) that is greater than 1 in an XRD analysis spectrum using Cu-K$\alpha$ radiation. In other words, after a lithium secondary battery is charged at a voltage of 4.5 V or more, for example, 4.54 V or more, $I_{O3}/I_{H1-3}$ of the lithium cobalt oxide containing a metal element may be greater than 1. In other words, even when a charging cutoff voltage of a lithium secondary battery including the positive active material is 4.5V or more, a phase transition from the O3 phase to the H1-3 phase is suppressed, and thus, the O3 phase may be present as a main phase.

In the XRD analysis spectrum using Cu-K$\alpha$ radiation (ex-situ synchrotron), a peak intensity of the O3 phase is a peak intensity measured in a range of $18°<2\theta<18.7°$.

In the XRD analysis spectrum using Cu-K$\alpha$ radiation (ex-situ synchrotron), a peak intensity of the H1-3 phase is a peak intensity measured in a range of $18.7°<2\theta<19.5°$.

For example, $I_{O3}/I_{H1-3}$ may be greater than 1.0 and equal to or less than 5.0. For example, $I_{O3}/I_{H1-3}$ may be in a range of about 3.0 to about 5.0. Within the aforementioned range, the O3 phase is mainly present even when a lithium secondary battery is charged at a high voltage, and thus, the lifespan characteristics of the lithium secondary battery may be improved.

According to an embodiment, the metal element may be placed in a site of the cobalt in a crystal lattice of the lithium cobalt oxide. In detail, the metal element may be placed in a site of the cobalt in a crystal lattice of the lithium cobalt oxide by substituting Co in a crystal lattice of the lithium cobalt oxide. For example, some cobalt in a crystal lattice of the lithium cobalt oxide may be substituted with the metal element. In detail, some Co included in an O3-type layered structure of the lithium cobalt oxide, which has the arrangement of O—Li—O—Co—O—Li—O—Co—O, may be substituted with the metal element. When the metal element may be placed in a site of the cobalt in a crystal lattice of the lithium cobalt oxide, the stability of an O3-type layered structure increases, and thus, a phase transition to the H1-3 phase may be suppressed.

According to an embodiment, the lithium cobalt oxide containing a metal element may not include any minor phase other than a phase according to a layered structure of the lithium cobalt oxide. For example, as all metal elements are placed in sites of the cobalt in a crystal lattice of the lithium cobalt oxide, a minor phase, which is formed by combining the metal element with Li and/or oxygen, may not be formed. In this regard, capacity deterioration, damage to a crystal lattice of the lithium cobalt oxide of the kind that the minor phase may cause may not occur.

According to an embodiment, the lithium cobalt oxide containing a metal element may not include a spinel compound, or a compound having a spinel phase. For example, when doping the lithium cobalt oxide with the metal element, a spinel phase due to the metal element may not be formed.

According to an embodiment, the metal element is at least one selected from the group consisting of magnesium (Mg), manganese (Mn), nickel (Ni), aluminum (Al), titanium (Ti), calcium (Ca), iron (Fe), copper (Cu), and zinc (Zn), but it is not limited thereto.

According to an embodiment, the metal element may be Mg, Mn, or a combination thereof.

According to an embodiment, the metal element has an oxidation number of 2 or 3. In other words, the metal element may be divalent or trivalent cation, and thus, the metal element may be suitable for substituting Co, which is trivalent cation, in a crystal lattice of the lithium cobalt oxide. The metal element may be regarded as a doping element since the metal element locates in various parts of a crystal lattice of the lithium cobalt oxide.

According to an embodiment, the lithium cobalt oxide may include two or more metal elements. When the lithium cobalt oxide is doped with two different metal elements, distortion of a crystal lattice may be reduced, compared to when the lithium cobalt oxide is doped with one metal element. Accordingly, a phase transition of a crystal lattice of the lithium cobalt oxide may be suppressed even at a high voltage at which most lithium ions are deintercalated.

According to an embodiment, the metal element may include Mg and Mn at the same time. The Mg may have an oxidation number of 3, and the Mn may have an oxidation number of 2. The two metal elements are combined with each other, and thus, a crystal structure having a better stability may be formed.

According to an embodiment, the lithium cobalt oxide containing a metal element may be represented by Formula 1:

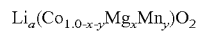     Formula 1 wherein in Formula 1,
$0.8 \leq a \leq 1.2$, $0.0025 \leq x \leq 0.005$, and $0.001 \leq y \leq 0.0075$.

Within the aforementioned ranges, Mg and Mn may be positioned by substituting Co. For example, Mg and Mn ions that do not form a crystal lattice are not present, and thus a minor phase having a layered structure, such as $LiMnO_2$ and/or $Li_2MnO_3$, other than lithium cobalt oxide may not exist. Also, a spinel phase such as $LiMn_2O_4$ may not exist.

In addition, within the aforementioned ranges, a layered structure of the lithium cobalt oxide containing a metal element is stabilized, and thus, a phase transition from the O3 phase to the H1-3 phase may be suppressed. For example, when the charging cutoff voltage of a lithium secondary battery including the lithium cobalt oxide containing a metal element is greater than 4.5 V, the O3 phase exists as a main phase and demonstrates excellent lifespan characteristics.

According to an embodiment, an average oxidation number N of metal atoms included in the lithium cobalt oxide may be in a range of about 2.1 to about 2.75. Within the aforementioned range, the metal element may substitute cobalt in a crystal lattice of the lithium cobalt oxide. Also, the crystal lattice of the lithium cobalt oxide may be more structurally stabilized than a crystal lattice that only includes Co having an average oxidation number of 3.

For example, the lithium cobalt oxide containing a metal element may be $Li(Co_{0.9965}Mg_{0.0025}Mn_{0.001})O_2$, $Li(Co_{0.995}Mg_{0.0025}Mn_{0.0025})O_2$, $Li(Co_{0.9925}Mg_{0.0025}Mn_{0.005})O_2$, $Li(Co_{0.99}Mg_{0.0025}Mn_{0.0075})O_2$, $Li(Co_{0.994}Mg_{0.005}Mn_{0.001})O_2$, $Li(Co_{0.9925}Mg_{0.005}Mn_{0.0025})O_2$, $Li(Co_{0.99}Mg_{0.005}Mn_{0.005})O_2$, $Li(Co_{0.9875}Mg_{0.005}Mn_{0.0075})O_2$, or the like, but is not limited thereto.

According to an embodiment, a c-axis lattice parameter of a unit lattice of the lithium cobalt oxide containing a metal element may be 14.050 Å or more. For example, the c-axis lattice parameter may be in a range of about 14.050 Å to about 14.070 Å. Within the aforementioned range, the structural stability of a crystal lattice including the unit lattice may be improved. The c-axis lattice parameter may be determined by XRD Rietveld refinement (H. M. Rietveld, J. Appl. Cryst. (1969). 2, 65-71, A profile refinement method for nuclear and magnetic structures).

In detail, as substitutions of cobalt with the metal element increase, a c-axis lattice parameter of a unit lattice of the lithium cobalt oxide containing a metal element also increases. When a c-axis lattice parameter increases, strain caused by a repetition of intercalation/deintercalation of lithium ions while charging and discharging and applied to a crystal structure is reduced. In this regard, when lots of lithium ions are deintercalated from the lithium cobalt oxide, the crystal structure may be stabilized.

Figure 4A:
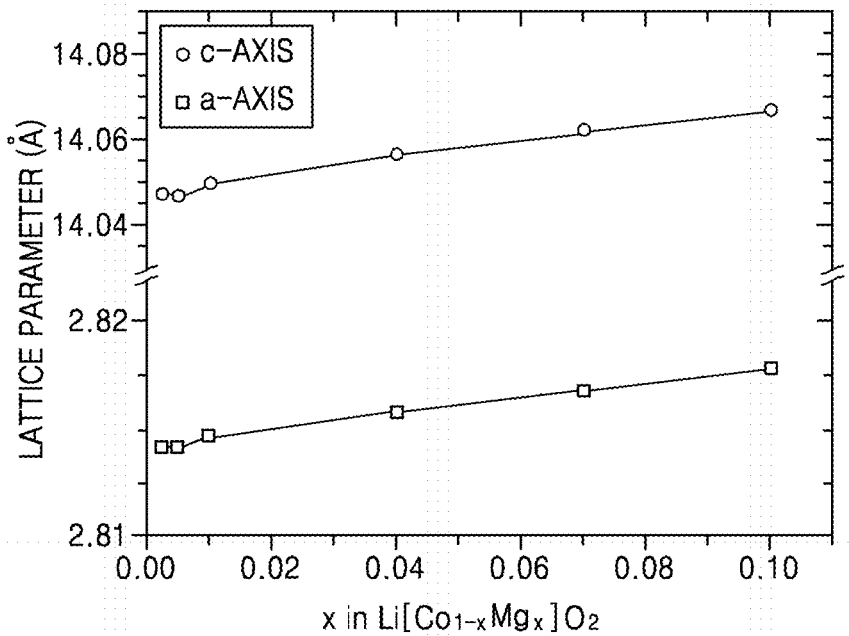
FIG. 4A shows measuring results of a-axis and c-axis lattice parameters of $LiCo_{1-x}Mg_xO_2$ according to changes in magnesium (Mg) doping amounts.
Figure 4B:
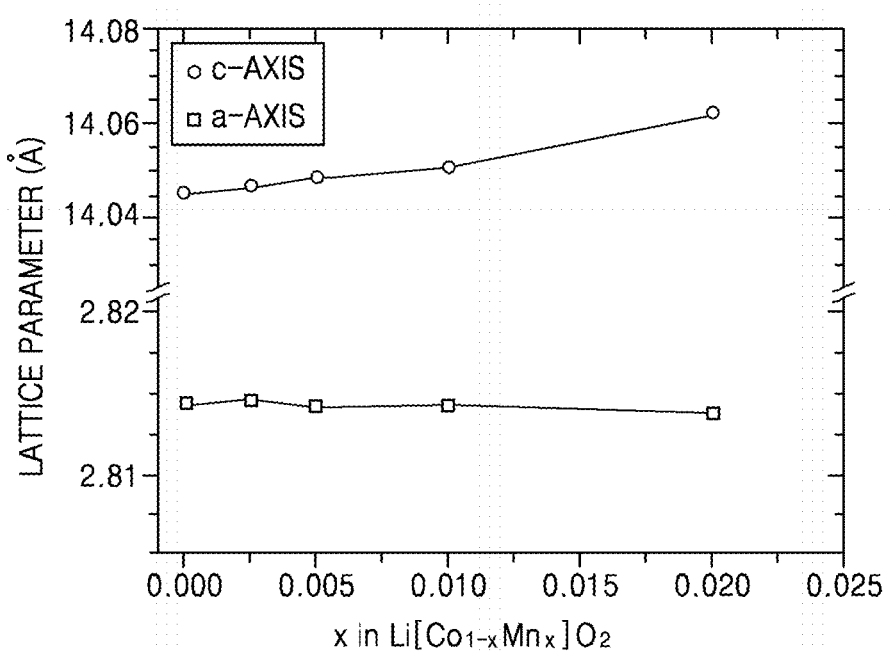
FIG. 4B shows measuring results of a-axis and c-axis lattice parameters of $LiCo_{1-x}Mn_xO_2$ according to changes in manganese (Mn) doping amounts.

FIG. 4A shows measured results of a-axis and c-axis lattice parameters of $LiCo_{1-x}Mg_xO_2$ according to changes in Mg doping amounts, and FIG. 4B shows measured results of a-axis and c-axis lattice parameters of $LiCo_{1-x}Mn_xO_2$ according to changes in Mn doping amounts.

As shown in FIGS. 4A and 4B, as Mg and Mn doping amounts increase, a c-axis lattice parameter also increases. Also, an increase in the c-axis lattice parameter according to the doping amounts is substantially constant, which shows that Co in a crystal lattice is substituted with Mg and Mn.

Figure 5:
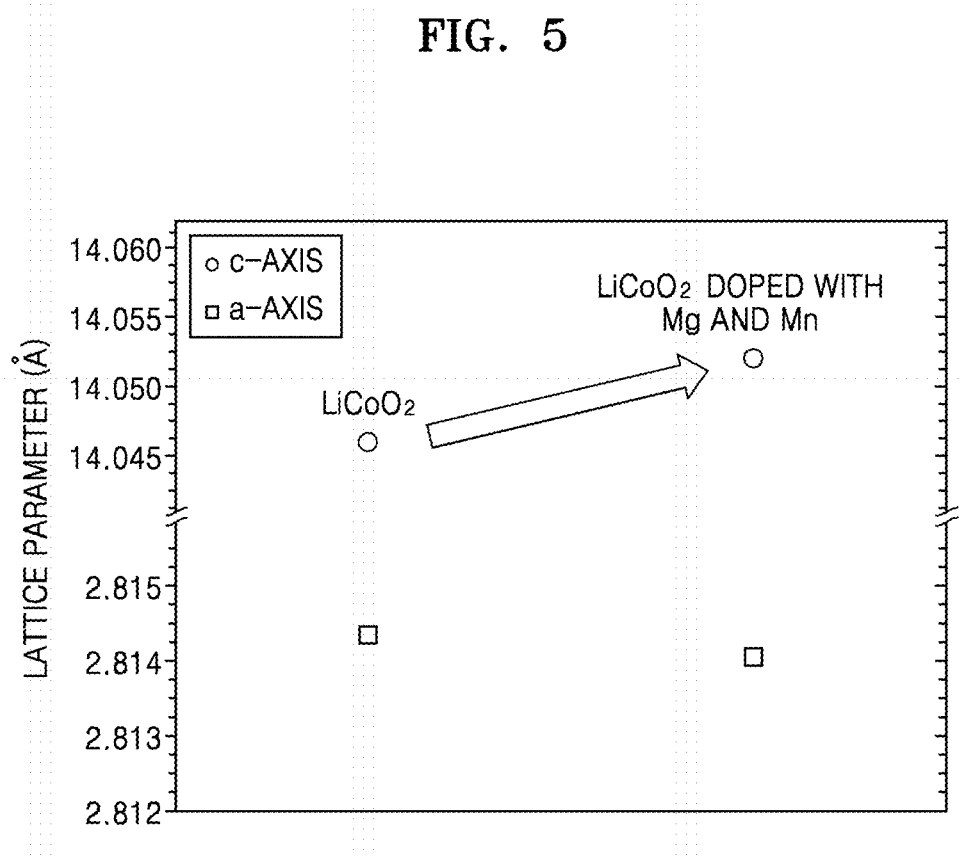
FIG. 5 shows a-axis and c-axis lattice parameters of $LiCoO_2$ before and after $LiCoO_2$ is doped with Mg and Mn.

FIG. 5 shows a-axis and c-axis lattice parameters of $LiCoO_2$ before and after $LiCoO_2$ is doped with Mg and Mn. A c-axis lattice parameter of $LiCoO_2$ that is not doped with Mg and Mn is about 14.046 Å, whereas a c-axis lattice parameter of $LiCoO_2$ that is doped with Mg and Mn may be 14.050 Å or more. Therefore, as the c-axis lattice parameter increases, the stability of a crystal structure of lithium cobalt oxide is improved, and as intercalation/deintercalation of lithium ions gets easier, the lifespan characteristics of a lithium secondary battery are improved.

According to an embodiment, an average particle diameter D50 of the lithium cobalt oxide containing a metal element may be in a range of about 1 μm to about 50 μm. For example, the average particle diameter D50 of the lithium cobalt oxide containing a metal element may be in a range of about 1 μm to about 30 μm, for example, about 5 μm to about 20 μm. When the average particle diameter D50 of the lithium cobalt oxide containing a metal element is within the aforementioned range, the lithium cobalt oxide containing a metal element may be used as a positive active material for a lithium battery at high voltage, and thus the lithium secondary battery including the lithium cobalt oxide containing a metal element may have excellent lifespan characteristics.

The term average particle diameter as used herein means a particle size corresponding to 50%, D50, when the total number of particles is 100% in an accumulated particle size distribution curve in which particles are sequentially accumulated in the order of a particle having the smallest size to a particle having the largest size. D50 may be measured by using widely known methods, for example, a method using a particle size analyzer, or from transmission electron microscopy (TEM) or scanning electron microscopy (SEM) images. Alternatively, for example, after a measurement apparatus using dynamic light-scattering is used, data analysis is performed to count the number of particles of lithium cobalt oxide for each of the size ranges, which will provide the D50 values.

The positive active material may further include a known positive active material which has at least one different technical characteristic than the positive active material described above in the composition, for example diameter or the like.

The positive active material may be any positive active material that is generally used in the art. For example, the positive active material may include a compound represented by any one selected from formulae: $Li_aA_{1-b}B'_bD'_2$ (wherein, $0.90 \leq a \leq 1$ and $0 \leq b \leq 0.5$); $Li_aE_{1-b}B'_bO_{2-c}D'_c$ (wherein, $0.90 \leq a \leq 1$, $0 \leq b \leq 0.5$, and $0 \leq c \leq 0.05$); $LiE_{2-b}B'_bO_{4-c}D'_c$ (wherein, $0 \leq b \leq 0.5$ and $0 \leq c \leq 0.05$); $Li_aNi_{1-b-c}Co_bB'_cD'_\alpha$ (wherein, $0.90 \leq a \leq 1$, $0 \leq b \leq 0.5$, and $0 \leq c \leq 0.05$, and $0 < \alpha \leq 2$); $Li_aNi_{1-b-c}Co_bB'_cO_{2-\alpha}F'_\alpha$ (wherein, $0.90 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F'_2$ (wherein, $0.90 \leq a \leq 1$, $0 \leq b \leq 0.5$, $0 \leq c \leq 0.05$, and $0 < \alpha \leq 2$); $Li_aNi_{1-b-c}Mn_bB'_cD'_\alpha$ (wherein, $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein, $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'_2$ (wherein, $0.90 \leq a \leq 1$, $0 \leq b \leq 0.5$, $0 \leq c \leq 0.05$, and $0 < \alpha \leq 2$); $Li_aNi_bE_cG_dO_2$ (wherein, $0.90 \leq a \leq 1$, $0 \leq b \leq 0.9$, $0 \leq c \leq 0.5$, and $0.001 \leq d \leq 0.1$); $Li_aNi_bCo_cMn_dG_eO_2$ (wherein, $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (wherein, $0.90 \leq a \leq 1$ and $0.001 \leq b \leq 0.1$); $Li_aCoG_bO_2$ (wherein, $0.90 \leq a \leq 1$ and $0.001 \leq b \leq 0.1$); $Li_aMnG_bO_2$ (wherein, $0.90 \leq a \leq 1$ and $0.001 \leq b \leq 0.1$); $Li_aMn_2G_bO_4$ (wherein, $0.90 \leq a \leq 1$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the formulae above, A is Ni, Co, Mn, or a combination thereof; B' is Al, Ni, Co, Mn, Cr, Fe, Mg, Sr, V, a rare earth metal element, or a combination thereof; D' is oxygen (O), fluorine (F), sulfur (S), phosphorus (P), or a combination thereof; E is Co, Mn, or a combination thereof; F' is F, S, P, or a combination thereof; G is Al, Cr, Mn, Fe, Mg, lanthanum (La), cerium (Ce), Sr, V, or a combination thereof; Q is Ti, molybdenum (Mo), Mn, or a combination thereof; I' is Cr, V, Fe, Sc, Y, or a combination thereof; and J is V, Cr, Mn, Co, Ni, Cu, or a combination thereof.

For example, the positive active material may be one selected from $LiCoO_2$, $LiMn_xO_{2x}$ (x=1 or, 2), $LiNi_{1-x}Mn_xO_{2x}$ (0<x<1), $LiNi_{1-x-y}Co_xMn_yO_2$ (0≤x≤0.5 and 0≤y≤0.5), and $FePO_4$.

The compounds may have a coating layer formed thereon, or may be mixed with a compound having a coating layer. The coating layer may include a coating element compound, such as an oxide of a coating element, a hydroxide of a coating element, an oxyhydroxide of a coating element, an oxycarbonate of a coating element, or a hydroxycarbonate of a coating element. The compounds that form the coating layer may be amorphous or crystalline. As a coating element included in the coating layer, Mg, Al, Co, K, Na, Ca, Si, Ti, V, Sn, germanium (Ge), gallium (Ga), B, arsenic (As), Zr, or a mixture thereof may be used. The coating layer may be formed by using any one of various coating methods that are performed using the compounds and the elements and do not affect the properties of the positive active material (for example, spray coating, immersion, or the like).

The positive active material may be prepared by calcining a metal hydroxide and a lithium salt. For example, the positive active material may be prepared by continuously adding an aqueous solution including a salt containing a desired metal in a co-precipitation environment, according to a desired positive active material composition to prepare a mixture; washing, filtering, and drying the mixture to prepare a metal hydroxide; and mixing the metal hydroxide with a lithium salt and calcining the mixture under general calcination conditions to prepare a lithium metal composite oxide. However, the method is not limited thereto, and the lithium metal composite oxide may be manufactured by any general method used in the art.

A positive electrode according to another embodiment includes the positive active material described above.

The positive electrode may be manufactured as follows:

The positive electrode for example, may be manufactured by mixing the positive active material, a binder, and optionally, a conductor in a solvent to prepare a positive active material composition, which may then be molded into a certain shape or spread on a current collector such as aluminum.

The binder used in the positive active material composition is a component that facilitates binding of the positive active material to the conductor and binding of the positive active material to the current collector. In addition, the binder is added in an amount of about 1 part by weight to about 50 parts by weight based on 100 parts by weight of the positive active material. For example, the binder may be added in an amount of 1 part by weight to about 30 parts by weight, about 1 part by weight to about 20 parts by weight, or about 1 part by weight to about 15 parts by weight based on 100 parts by weight of the positive active material. The binder may be selected from polyvinylidene fluoride (PVdF), polyvinylidene chloride, polybenzimidazole, polyimide, polyvinyl acetate, polyacrylonitrile, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polystyrene, polymethyl methacrylate, polyaniline, acrylonitrile-butadiene-styrene, phenolic resin, epoxy resin, polyethylene terephthalate, polytetrafluoroethylene, polyphenylene sulfide, polyamide-imide, polyetherimide, polyethylene sulfone, polyamide, polyacetal, polyphenylene oxide, polybutylene terephthalate, ethylene-propylene-diene monomer (EPDM), sulfonated EPDM, styrene butadiene rubber (SBR), fluororubber, or a combination thereof, but the binder is not limited thereto.

The positive electrode provides a conductive pathway to the positive active material and may selectively further include a conductor that may improve electrical conductivity of the positive electrode. The conductor may be any conductor generally used in a lithium battery, and examples thereof include carbonaceous materials such as carbon black, acetylene black, Ketjen black, carbon fiber, or the like; metallic materials such as a metal powder or metal fiber of copper, nickel, aluminum, or silver; conductive polymers such as polyphenylene derivatives, or a mixture thereof. The amount of the conductor may be appropriately controlled. For example, a weight ratio of the positive active material to the conductor may be in a range of about 99:1 to about 90:10.

The solvent may be N-methylpyrrolidone (NMP), acetone, water, or the like. The amount of the solvent may be about 1 part by weight to about 400 parts by weight based on 100 parts by weight of the positive active material. When the amount of the solvent is in the range described above, a process for forming an active material layer may be easy.

Also, the current collector may typically be formed to have a thickness of about 3 μm to about 500 μm. The current collector is not particularly limited as long as the current collector does not cause a chemical change in a battery and has conductivity. Examples of a material that forms the current collector are copper, stainless steel, aluminum, nickel, titanium, calcined carbon, copper and stainless steel that are surface-treated with carbon, nickel, titanium, silver, or the like, an alloy of aluminum and cadmium, etc. Also, an uneven microstructure may be formed on the surface of the current collector to enhance a binding strength of the positive active material. Also, the current collector may be used in various forms including a film, a sheet, a foil, a net, a porous structure, a foaming structure, a non-woven structure, etc.

A copper current collector may be directly coated with a negative active material composition to prepare a positive electrode. Alternatively, the negative active material composition may be cast on a separate support, a positive active material film peeled off from the support may be used to laminate an aluminum current collector, and the aluminum current collector is dried and rolled and then vacuum-heated at a temperature in a range of about 50° C. to about 250° C. to manufacture a positive electrode plate. However, the positive electrode is not limited to the above and may have a shape other than the shape described above.

A lithium battery according to another embodiment includes a positive electrode including the positive active material. In more detail, the lithium battery includes a positive electrode including the positive active material; a negative electrode disposed opposite to the positive electrode; and a separator disposed between the positive electrode and the negative electrode; and an electrolyte. The lithium battery may be manufactured as follows:

First, a positive electrode is manufactured according to the manufacturing method of the positive electrode.

Then, the negative electrode may be manufactured as follows: The negative electrode may be manufactured in the same manner as the positive electrode, except that a negative active material is used instead of the positive active material. Also, in a negative active material composition, a binder, a conductor, and a solvent may be the same as those used in the positive electrode.

For example, the negative active material, the binder, the conductor, and the solvent may be mixed to prepare a negative active material composition, which may then be used to directly coat a copper current collector to manufacture a negative electrode plate. Alternatively, the negative active material composition may be cast on a separate support, and a negative active material film peeled off therefrom may be used to laminate the copper current collector to manufacture the negative electrode plate.

The negative active material may be any material that may be used as a negative active material for a lithium battery in the art. For example, the negative active material may be at least one selected from the group consisting of a lithium metal, a metal alloyable with lithium, a transition metal oxide, a non-transition metal oxide, and a carbonaceous material.

For example, the metal alloyable with lithium may be Si, Sn, Al, Ge, Pb, Bi, Sb, Si—Y' alloy (wherein, Y' is an alkali metal, an alkaline earth metal, a Group 13 element, a Group 14 element, a transition metal, a rare earth metal element, or a combination element thereof, but not Si), and Sn—Y' alloy (an alkali metal, an alkaline earth metal, a Group 13 element, a Group 14 element, a transition metal, a rare earth metal element, or a combination element thereof, but not Sn). The element Y' may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or a combination thereof.

For example, the transition metal oxide may be a lithium titanium oxide, a vanadium oxide, a lithium vanadium oxide, or the like.

For example, the non-transition metal oxide may be $SnO_2$, $SiO_x$ ($0<x<2$), or the like.

The carbonaceous material may be a crystalline carbon, an amorphous carbon, or a combination thereof. Examples of the crystalline carbon include graphite such as natural graphite or synthetic graphite having an amorphous, flat, flake, spherical, or fiber shape, and examples of the amorphous carbon include soft carbon or hard carbon, mesophase pitch carbide, or calcined coke.

Then, a separator to be disposed between the positive electrode and the negative electrode is prepared. The separator may be any separator that is generally used in a lithium battery. For example, the separator may include a material that has a low resistance to migration of ions of an electrolyte and an excellent electrolytic solution-retaining capability. For example, the separator may include a material selected from the group consisting of glass fiber, polyester, Teflon, polyethylene, polypropylene, polytetrafluoroethylene (PTFE), and a combination thereof, each of which may be nonwoven or woven. The separator may have a pore size of about 0.01 μm to about 10 μm and a thickness of about 5 μm to about 300 μm.

The electrolyte may include a non-aqueous electrolyte and a lithium salt. Examples of the non-aqueous electrolyte are a non-aqueous electrolytic solution, an organic solid electrolyte, an inorganic solid electrolyte, etc.

As the non-aqueous electrolytic solution, an aprotic organic solvent may be used, and examples of the aprotic organic solvent are N-methyl-2-pyrrolidone, propylene carbonate, ethylene carbonate (EC), butylene carbonate (BC), dimethyl carbonate (DMC), diethyl carbonate (DEC), ethyl methyl carbonate (EMC) gamma-butyrolactone (GBL), 1,2-dimethoxyethane (DME), tetrahydrofuran (THF), 2-methyltetrahydrofuran, dimethyl sulfoxide (DMSO), 1,3-dioxolane (DOL), formamide, dimethylformamide, acetonitrile, nitromethane, methyl formate, methyl acetate, phosphate triester, trimethoxymethane, dioxolane derivatives, sulfolane, methyl sulfolane, 1,3-dimethyl-2-imidazolidinone, propylene carbonate derivatives, tetrahydrofuran derivatives, ethers, methyl propionic acid, ethyl propionic acid, etc.

Examples of the organic solid electrolyte are polyethylene derivatives, polyethylene oxide derivatives, polypropylene oxide derivatives, phosphate ester polymer, polyagitation lysine, polyester sulfide, polyvinyl alcohol, vinylidene polyfluoride, a polymer having an ionic dissociable group, etc.

Examples of the inorganic solid electrolyte are nitrides, halides, and sulfates of Li, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, or the like.

The lithium salt may be any one of various lithium salts that are used in a lithium battery. As a material that may be dissolved well in the non-aqueous electrolyte, for example, one or more of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic carbonic acid lithium, 4-phenylboronic acid lithium, lithium imide, etc. may be used.

In addition, the electrolyte may include vinylene carbonate (VC), catechol carbonate (CC), or the like to form and maintain an SEI (Solid Electrolyte Interface) layer on the surface of the negative electrode. In some other embodiments, the electrolyte may include a redox-shuttle additive, for example, n-butyl ferrocene, a halogen-substituted benzene, or the like to prevent overcharging. In some other embodiments, the electrolyte may include a film-forming additive, for example, cyclohexyl benzene, biphenyl, or the like. In some other embodiments, the electrolyte may include a cation receptor, such as a crown ether-based compound, and an anion receptor, such as a boron-based compound, to improve conductive characteristics thereof. In some other embodiments, the electrolyte may further include a phosphate-based compound as a flame-retardant material, for example, trimethyl phosphate (TMP), tris(2,2,2-trifluoroethyl)phosphate (TFP), hexamethoxy cyclotriphosphazene (HMTP), or the like.

The electrolyte may further include an additive to facilitate the formation of a stable SEI layer or film on the surface of an electrode to further improve the safety of the lithium battery, if desired. Non-limiting examples of the additive are tris(trimethylsilyl)phosphate (TMSPa), lithium difluoro(oxalato)borate (LiFOB), propane sultone (PS), succinonitrile (SN), $LiBF_4$, a silane compound having a functional group able to form a siloxane bond (for example, an acryl group, an amino group, an epoxy group, a methoxy group, an ethoxy group, or a vinyl group), and a silazane compound, such as hexamethyldisilazane. For example, the additive may be PS, SN, $LiBF_4$, or the like.

For example, lithium salts such as $LiPF_6$, $LiClO_4$, $LiBF_4$, and $LiN(SO_2CF_3)_2$ may be added to a mixture of solvent such as a cyclic carbonate of EC or PC, which has high dielectric constant, and a linear carbonate of DEC, DMC, or EMC, which is a low viscosity solvent, to prepare an electrolyte.

Figure 6:
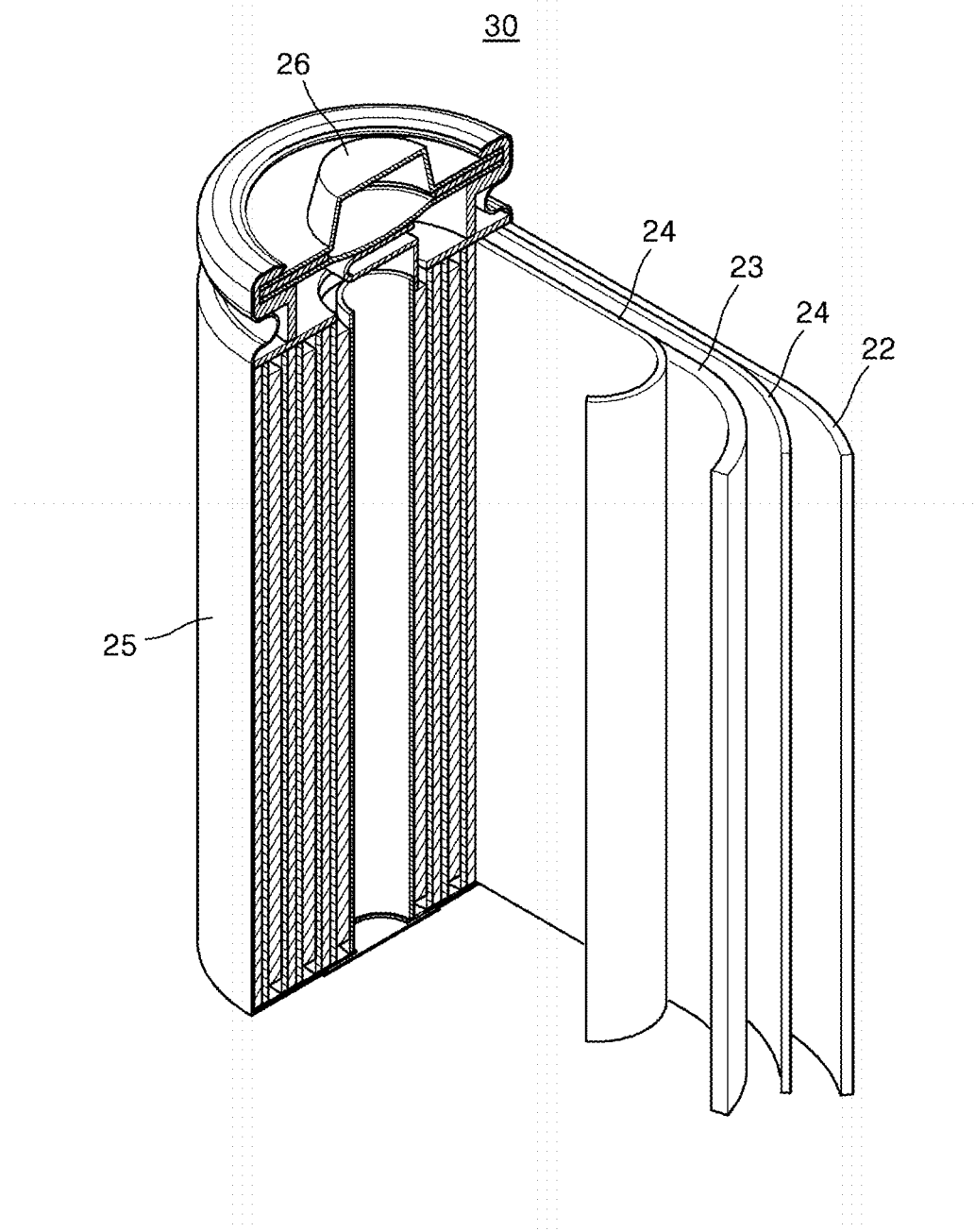
FIG. 6 is a schematic view showing a structure of a lithium battery according to an embodiment.
Figure 7:
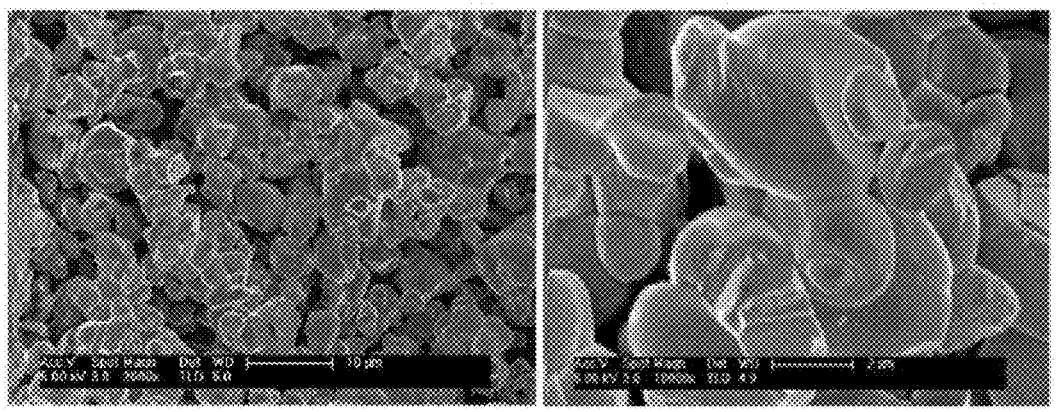
FIG. 7 shows scanning electron microscopic (SEM) images of the positive active material prepared in Example 1 (magnification—left: 2,000× and right: 10,000×)
Figure 8:
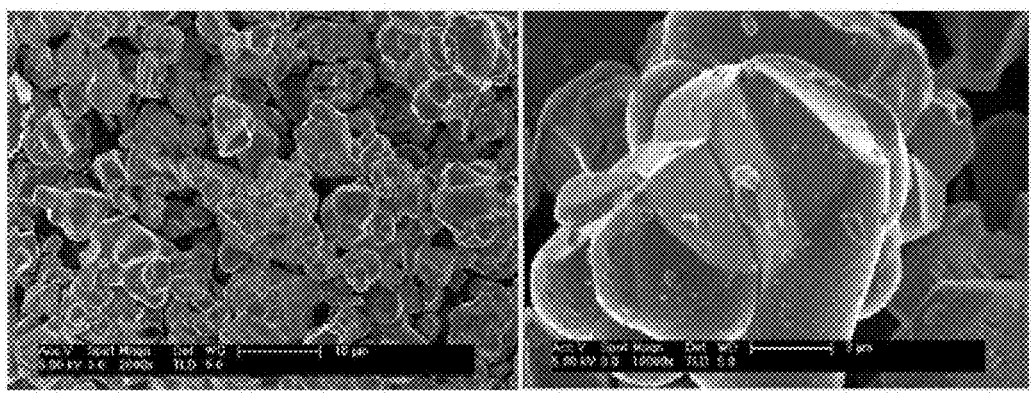
FIG. 8 shows SEM images of the positive active material prepared in Example 2 (magnification—left: 2,000× and right: 10,000×)
Figure 9:
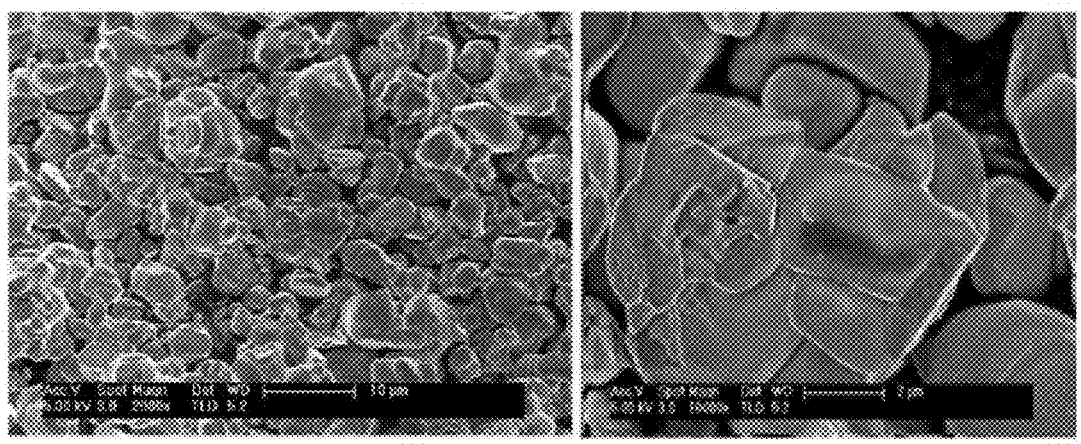
FIG. 9 shows SEM images of the positive active material prepared in Example 4 (magnification—left: 2,000× and right: 10,000)
Figure 10:
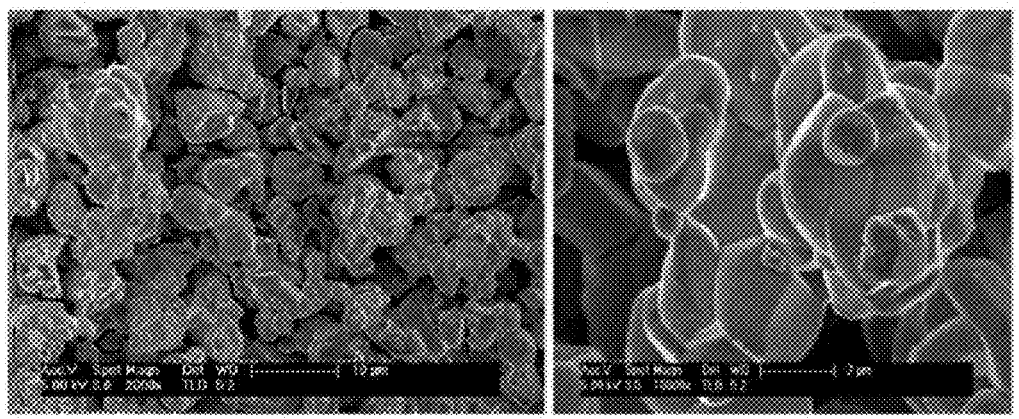
FIG. 10 shows SEM images of the positive active material prepared in Example 5 (magnification—left: 2,000× and right: 10,000×)
Figure 11:
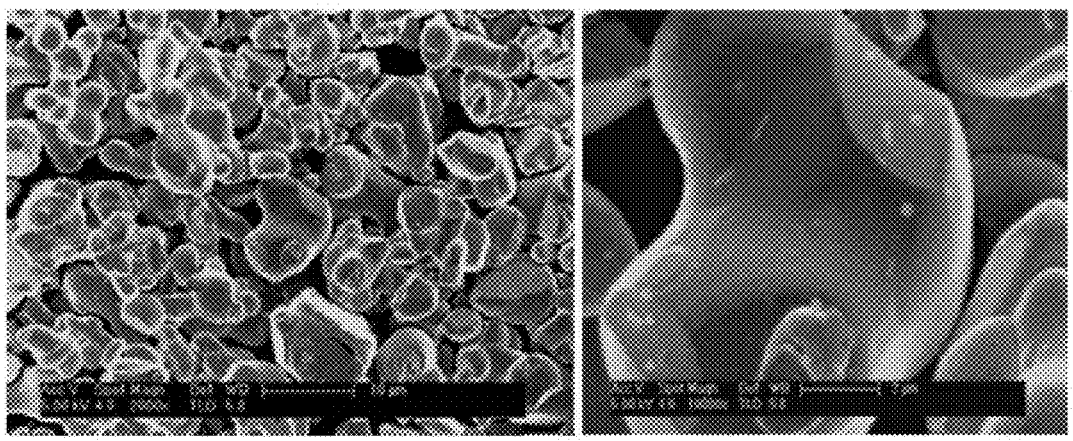
FIG. 11 shows SEM images of the positive active material prepared in Comparative Example 1 (magnification—left: 2,000× and right: 10,000×)
Figure 12:
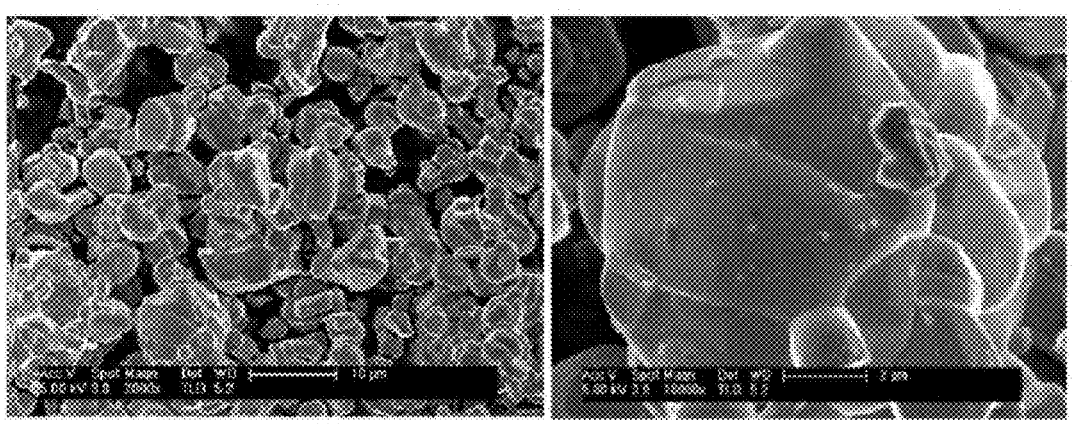
FIG. 12 shows SEM images of the positive active material prepared in Comparative Example 2 (magnification—left: 2,000× and right: 10,000×)

FIG. 6 is a schematic view showing a structure of a lithium battery 30 according to an embodiment.

Referring to FIG. 6, the lithium battery 30 includes a positive electrode 23, a negative electrode 22, and a separator 24 disposed between the positive electrode 23 and the negative electrode 22. In addition, to prevent an internal short circuit, a separator 24 may be further included on the outer surface of the positive electrode 23 or the negative electrode 22. The positive electrode 23, the negative electrode 22, and the separator 24 are wound or folded, and then accommodated in a battery case 25. Subsequently, an electrolyte is injected into the battery case 25, and the battery case 25 is sealed with a cap assembly member 26 and thus completes the manufacture of the lithium battery 30. The battery case 25 may have a cylindrical shape, a rectangular shape, or a thin-film shape. The lithium battery 30 may be a lithium ion battery.

A formation process may be performed on the manufactured lithium battery to stabilize a battery structure and to make it usable. For example, the formation process may include an aging process, a charging process, a discharging process, or the like of the lithium battery.

In the aging process, the lithium battery structure is impregnated with an electrolyte.

In the charging process, the lithium battery is completely charged so that an SEI layer forms on the surface of a negative electrode. A charging cutoff voltage of a battery may be 4.5 V or more in the charging process to manufacture a lithium secondary battery for a high voltage.

In the discharging process, the lithium battery charged in the charging process is completely discharged, and then, may be re-charged for a product release.

The lithium batteries may be classified as either winding type or stack type depending on a structure of electrodes, or as either cylindrical type, rectangular type, coin type, or pouch type, depending on a type of exterior shape thereof.

Lithium batteries may be used as power sources for small devices, and as unit cells of medium- or large-sized battery devices, each module consisting of a plurality of cells.

Non-limiting examples of the medium- or large-sized devices are power tools; electric cars, including electric vehicles (EVs), hybrid electric vehicles (HEVs), plug-in hybrid electric vehicles (PHEVs); electric two-wheeled vehicles, including E-bikes and E-scooters; electric golf carts; electric trucks; electric commercial vehicles, and power storage systems. In addition, the lithium battery may be used in any applications that require high-power output and a high voltage, and operate under high-temperature conditions.

According to an embodiment, the lithium battery may be a lithium secondary battery for a high voltage. A charging cutoff voltage of the lithium secondary battery may be 4.5 V or more. In detail, the lithium secondary battery is capable of being charged to have a charging cutoff voltage equal to or greater than 4.5 V. For example, a charging cutoff voltage of the lithium secondary battery may be in a range of about 4.54 V to about 4.8 V.

According to an embodiment, after the lithium secondary battery is charged up to 4.5 V, in an XRD analysis spectrum, using Cu-Kα radiation, of a lithium cobalt oxide containing a metal element included in the positive electrode, $I_{O3}/I_{H1-3}$ may be greater than 1. Only one charging (charging during the formation process is included) at a voltage of 4.54 V or more may cause a phase transition from the O3 phase to the H1-3 phase. However, by including the aforementioned positive active material for a high voltage, a phase transition from the O3 phase to the H1-3 phase may be suppressed. As a result, the lifespan characteristics of the lithium secondary battery may be improved.

Examples are provided in order to highlight the characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples. The examples are presented for illustrative purposes only and do not limit the scope of the disclosure.

Preparation of Lithium Secondary Battery

Example 1—Positive Active Material
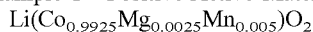

Preparation of Positive Electrode

Measured contents of lithium precursor 46.158 g $Li_2CO_3$, cobalt precursor 100 g $Co_3O_4$, and metal element precursor 0.266 g $MgCO_3$ and 0.481 g $Mn_3O_4$ were prepared as starting materials to prepare $Li(Co_{0.9925}Mg_{0.0025}Mn_{0.005})O_2$. The starting materials were put into pulverizing equipment with a ball, and then mixed and pulverized by using Powder mixer (KM tech., Incheon city, Korea) for an hour. The pulverized mixture was inserted into a furnace, and then, dry air was supplied thereto to flow therein while calcining the same at a temperature of 1020° C. at a heating rate of 2° C./min for 10 hours, and thus, a positive active material, 100 g $Li(Co_{0.9925}Mg_{0.0025}Mn_{0.005})O_2$ that has an average particle diameter D50 of 8 μm and a c-axis lattice parameter of 14.055 Å, was prepared. In an XRD analysis spectrum, using Cu-Kα radiation (X'Pert³ Powder, PANalytical, California, USA), of the positive active material, a minor phase and an additional spinel phase other than a layered structure of the positive active material were not present.

The prepared positive active material, polyvinylidene fluoride (PVdF) as a binder, and a carbonaceous conductor (Denka Black) as a conductor were mixed at a weight ratio of 96:2:2, and N-methyl pyrrolidone was added in an amount of 60 wt % of solid to adjust viscosity, to thereby prepare a positive active material composition.

The positive active material composition was coated on a 15 μm-thick Al current collector by using a method that is commonly used in the art to have a thickness of about 40 μm. The current collector, on which the positive active material composition was coated, was dried at room temperature, further dried at 120° C., and rolled and punched to prepare a positive electrode for use in a coin half cell.

Preparation of Lithium Secondary Battery

The positive electrode, a lithium metal as a counter electrode, and a propylene separator having a thickness of 14 μm were used, and an electrolyte was injected therein and then pressed to manufacture a 2032 standard coin cell. Here, the electrolyte was a solution in which $LiPF_6$ was dissolved to a concentration of 1.3 M in a mixture solution of EC, DEC, and a fluoroethylene carbonate (FEC) (a volume ratio of 5:70:25 of EC:DEC:FEC).

Example 2—Positive Active Material

A positive electrode was manufactured in the same manner as in Example 1, except that $Li(Co_{0.99}Mg_{0.005}Mn_{0.005})$ $O_2$ having an average particle diameter D50 of 8 μm and a c-axis lattice parameter of 14.055 Å was prepared and used as a positive active material instead of $Li(Co_{0.9925}Mg_{0.0025}Mn_{0.005})O_2$. In an XRD analysis spectrum, using Cu-Kα radiation, of the positive active material prepared herein, a minor phase and an additional spinel phase other than a layered structure of the positive active material were not present.

Example 3—Positive Active Material $Li(Co_{0.994}Mg_{0.005}Mn_{0.001})O_2$

A positive electrode was manufactured in the same manner as in Example 1, except that $Li(Co_{0.994}Mg_{0.005}Mn_{0.001})O_2$ having an average particle diameter D50 of 8 μm and a c-axis lattice parameter of 14.050 Å was prepared and then used as a positive active material instead of $Li(Co_{0.9925}Mg_{0.0025}Mn_{0.005})O_2$. In an XRD analysis spectrum, using Cu-Kα radiation, of the positive active material prepared herein, a minor phase and an additional spinel phase other than a layered structure of the positive active material were not present.

Example 4—Positive Active Material $Li(Co_{0.9925}Mg_{0.005}Mn_{0.0025})O_2$

A positive electrode was manufactured in the same manner as in Example 1, except that $Li(Co_{0.9925}Mg_{0.005}Mn_{0.0025})O_2$ having an average particle diameter D50 of 8 μm and a c-axis lattice parameter of 14.053 Å was prepared and then used as a positive active material instead of $Li(Co_{0.9925}Mg_{0.0025}Mn_{0.005})O_2$. In an XRD analysis spectrum, using Cu-Kα radiation, of the positive active material prepared herein, a minor phase and an additional spinel phase other than a layered structure of the positive active material were not present.

Example 5—Positive Active Material $Li(Co_{0.9875}Mg_{0.005}Mn_{0.0075})O_2$

A positive electrode was manufactured in the same manner as in Example 1, except that $Li(Co_{0.9875}Mg_{0.005}Mn_{0.0075})O_2$ having an average particle diameter D50 of 8 μm and a c-axis lattice parameter of 14.057 Å was prepared and then used as a positive active material instead of $Li(Co_{0.9925}Mg_{0.0025}Mn_{0.005})O_2$. In an XRD analysis spectrum, using Cu-Kα radiation, of the positive active material prepared herein, a minor phase and an additional spinel phase other than a layered structure of the positive active material were not present.

Comparative Example 1—Positive Active Material $LiCoO_2$

A positive electrode was manufactured in the same manner as in Example 1, except that $LiCoO_2$ having an average particle diameter D50 of 8 μm and a c-axis lattice parameter of 14.045 Å was prepared and then used as a positive active material instead of $Li(Co_{0.9925}Mg_{0.0025}Mn_{0.005})O_2$.

Comparative Example 2—Positive Active Material $Li(Co_{0.9875}Mg_{0.0075}Mn_{0.005})O_2$ A positive electrode was manufactured in the same manner as in Example 1, except that $Li(Co_{0.9875}Mg_{0.0075}Mn_{0.005})O_2$ having an average particle diameter D50 of 8 μm and a c-axis lattice parameter of 14.055 Å was prepared and then used as a positive active material instead of $Li(Co_{0.9925}Mg_{0.0025}Mn_{0.005})O_2$.

Comparative Example 3—Positive Active Material $Li(Co_{0.9995}Zr_{0.0005})O_2$

A positive electrode was manufactured in the same manner as in Example 1, except that $Li(Co_{0.9995}Zr_{0.0005})O_2$ having an average particle diameter D50 of 8 μm and a c-axis lattice parameter of 14.045 Å was prepared ($ZrO_2$ as zirconium precursor was used) and then used as a positive active material instead of $Li(Co_{0.9925}Mg_{0.0025}Mn_{0.005})O_2$.

Comparative Example 4—Positive Active Material $Li(Co_{0.999}Zr_{0.001})O_2$

A positive electrode was manufactured in the same manner as in Example 1, except that $Li(Co_{0.999}Zr_{0.001})O_2$ having an average particle diameter D50 of 8 μm and a c-axis lattice parameter of 14.045 Å was prepared (zirconium precursor $ZrO_2$ was used) and then used as a positive active material instead of $Li(Co_{0.9925}Mg_{0.0025}Mn_{0.005})O_2$.

Comparative Example 5—Positive Active Material $Li(Co_{0.998}Zr_{0.002})O_2$

A positive electrode was manufactured in the same manner as in Example 1, except that $Li(Co_{0.998}Zr_{0.002})O_2$ having an average particle diameter D50 of 8 μm and a c-axis lattice parameter of 14.045 Å was prepared ($ZrO_2$ as zirconium precursor was used) and then used as a positive active material instead of $Li(Co_{0.9925}Mg_{0.0025}Mn_{0.005})O_2$.

Comparative Example 6—Positive Active Material $Li(Co_{0.998}W_{0.002})O_2$

A positive electrode was manufactured in the same manner as in Example 1, except that $Li(Co_{0.998}W_{0.002})O_2$ having an average particle diameter D50 of 8 μm and a c-axis lattice parameter of 14.045 Å was prepared ($WO_3$ as tungsten precursor was used) and then used as a positive active material instead of $Li(Co_{0.9925}Mg_{0.0025}Mn_{0.005})O_2$.

Comparative Example 7—Positive Active Material $Li(Co_{0.995}W_{0.005})O_2$

A positive electrode was manufactured in the same manner as in Example 1, except that $Li(Co_{0.995}W_{0.005})O_2$ having an average particle diameter D50 of 8 μm and a c-axis lattice parameter of 14.045 Å was prepared (tungsten precursor $WO_3$ was used) and then used as a positive active material instead of $Li(Co_{0.9925}Mg_{0.0025}Mn_{0.005})O_2$.

Comparative Example 8—Positive Active Material $Li(Co_{0.9}W_{0.01})O_2$

A positive electrode was manufactured in the same manner as in Example 1, except that $Li(Co_{0.9}W_{0.01})O_2$ having an average particle diameter D50 of 8 μm and a c-axis lattice parameter of 14.045 Å was prepared (tungsten precursor $WO_3$ was used) and then used as a positive active material instead of $Li(Co_{0.9925}Mg_{0.0025}Mn_{0.005})O_2$.

Evaluation Example 1: Surface Analysis of Positive Active Material-SEM

Figure 13:
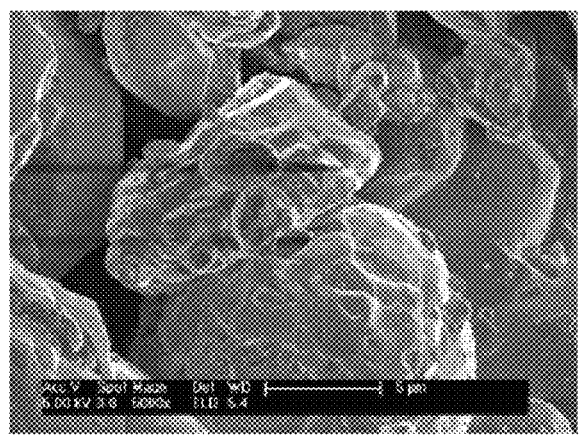
FIG. 13 shows SEM images of the positive active material prepared in Comparative Example 7 (magnification—5,000×)

SEM images of surfaces of the positive active materials manufactured in Examples 1, 2, 4 and 5, and Comparative Examples 1, 2, and 7 are shown in FIGS. 7 to 13. Left images in FIGS. 7 to 12 are measured at 2,000×, and right images are measured at 10,000×. An image in FIG. 13 is measured at 5,000×. The size of each particle of the positive active material was measured though the corresponding SEM image.

Evaluation Example 2: High Temperature Evaluation of Battery and XRD Analysis of Positive Active Material According to Changes in Mg Amounts The lithium secondary batteries manufactured in Examples 1-2 and Comparative Examples 1-2 were charged at a 0.1 C rate to a charging cutoff voltage of 4.55 V in a constant current mode and at a temperature of 45° C. Then, the lithium secondary batteries were discharged at a 0.1 C rate to a discharging cutoff voltage of 3.0 V in a constant current mode.

Then, the lithium secondary batteries were charged at a temperature of 45° C. and at a 0.2 C rate to a charging cutoff voltage of 4.55 V in a constant current mode. Thereafter, the lithium secondary batteries were discharged at a 0.2 C rate to a discharging cutoff voltage of 3.0 V in a constant current mode.

Lithium batteries, to which the formation and rating processes were subjected, were charged at a temperature of 45° C. and at a 1.0 C rate to a charging cutoff voltage of 4.55 V in a constant current mode, and then, a cycle including discharging the lithium batteries at a 1.0 C rate to a discharging cutoff voltage of 3.0 V in a constant current mode was repeated 50 times.

Initial charge/discharge efficiency (ICE), rate characteristics, each discharge capacity after the 30th cycle and the 50th cycle, and each capacity retention rate (CRR) after the 30th cycle and the 50th cycle of the lithium secondary batteries manufactured in Examples 1 and 2 and Comparative Examples 1 and 2 are measured and shown in Table 1 below. The CRR may be defined by Equation 1:

CRR [%]=[discharge capacity in each cycle/discharge capacity in $1^{st}$ cycle]×100    Equation 1

Also, the ICE may be defined by Equation 2:

ICE [%]=[initial charge capacity/capacity after initial discharge]×100    Equation 2

TABLE 1

| | | Comparative Example 1 | Example 1 | Example 2 | Comparative Example 2 |
|---|---|---|---|---|---|
| positive active material composition | substitution amount of Mg (mole) | — | 0.0025 | 0.005 | 0.0075 |
| | substitution amount of Mn (mole) | — | 0.005 | 0.005 | 0.005 |
| | average oxidation number (N) | — | 2.67 | 2.5 | 2.4 |
| 1st cycle | 0.1 C | 229 | 223 | 215 | 210 |
| | 0.1 D | 220 | 215 | 511 | 201 |
| | ICE (%) | 96 | 96 | 98 | 96 |
| capacity rate characteristics | 0.2 D | 213 | 211 | 208 | 200 |
| | 0.5 D | 206 | | 203 | |
| | 1 D | 193 | 199 | 199 | 189 |
| | 2 D | 181 | | 191 | |
| | 1 D/0.1 D (%) | 88 | 94 | 94 | 94 |
| | 2 D/0.2 D (%) | 85 | | 92 | |

TABLE 1-continued

| | | Comparative Example 1 | Example 1 | Example 2 | Comparative Example 2 |
|---|---|---|---|---|---|
| cycle characteristics | 1st discharge capacity (mAh/g) | 191 | 199 | 198 | 187 |
| | 30th discharge capacity (mAh/g) | 171 | | 192 | |
| | 50th discharge capacity (mAh/g) | 161 | 182 | 189 | 161 |
| CRR | 30th (%) | 90 | | 97 | |
| | 50th (%) | 84 | 94 | 95 | 86 |

In Table 1, 0.1 C denotes a charge capacity when the lithium secondary battery is charged at a rate of 0.1 C, 0.1 D denotes a discharge capacity when the lithium secondary battery is discharged at a rate of 0.1 C, 0.5D denotes a discharge capacity when the lithium secondary battery is discharged at a rate of 0.5 C, 1D denotes a discharge capacity when the lithium secondary battery is discharged at a rate of 1 C, and 2D denotes a discharge capacity when discharged at a rate of 2 C.

Also, XRD analysis using Cu-Kα radiation was performed on the positive active material layers that are charged once in a constant current mode after the formation and rating processes and manufactured in Examples 1 and 2 and Comparative Examples 1 and 2 (ex-situ synchrotron analysis, Pohang Accelerator Laboratory (PAL), Pohang city, Korea), and the results thereof are shown in FIGS. 14A, 14B, 15, and 16.

Figure 14A:
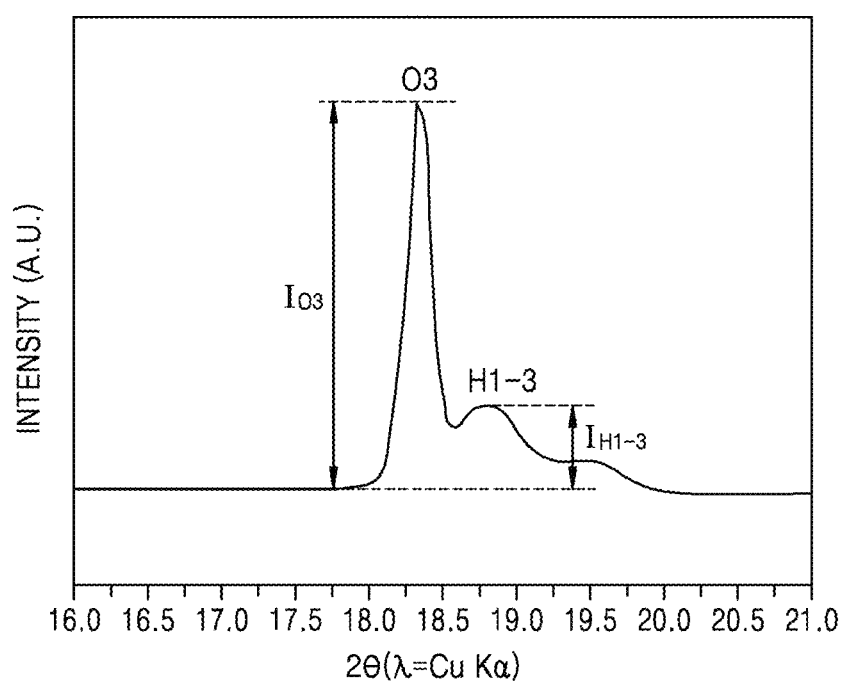
FIGS. 14A to 14B are respective XRD analysis spectrums of the positive active materials prepared in Examples 1 and 2 according to Evaluation Example 2.
Figure 14B:
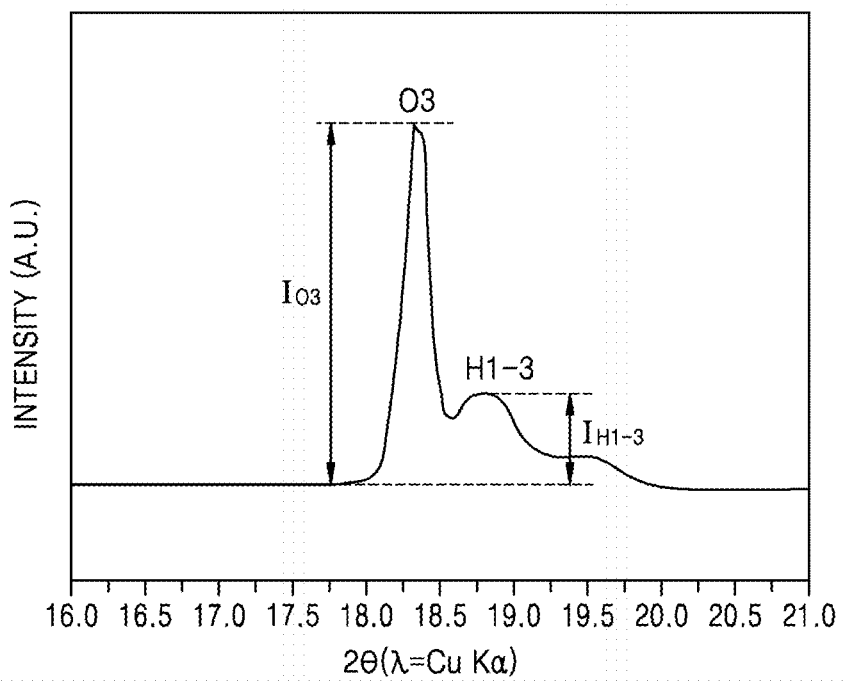

As shown in FIGS. 14A and 14B, it is found that the positive active materials prepared in Example 1 and Example 2 have a peak intensity of the O3 phase that is greater than a peak intensity of the H1-3 phase even when the lithium secondary battery charged at a high voltage of 4.55 V, which means that when preparing the positive active materials in Examples 1 and 2, a phase transition from the O3 phase to the H1-3 was suppressed. In detail, $I_{O3}/I_{H1-3}$ was 4.6 in FIG. 14A, and $I_{O3}/I_{H1-3}$ was 4.2 in FIG. 14B.

Figure 15:
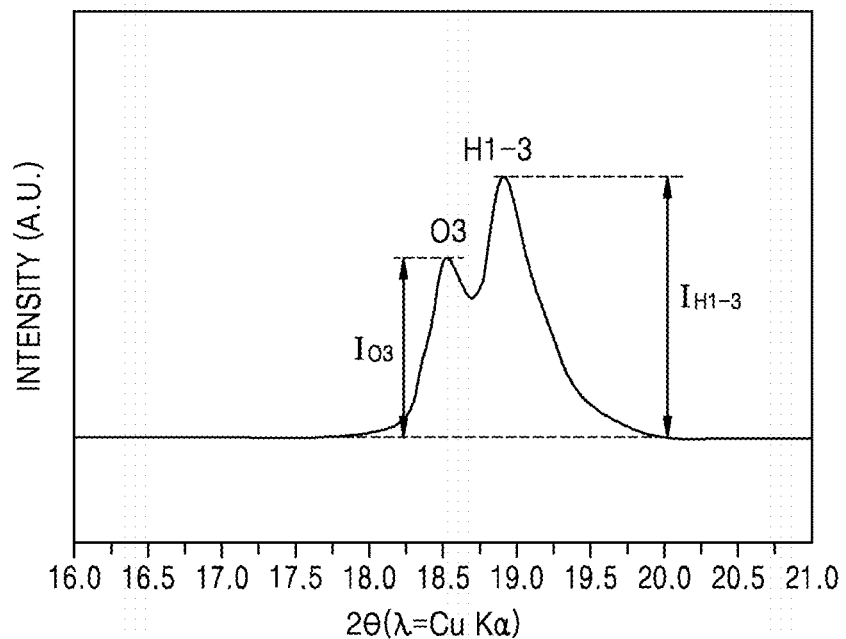
FIG. 15 is an XRD analysis spectrum of the positive active material prepared in Comparative Example 1 according to Evaluation Example 2.
Figure 16:
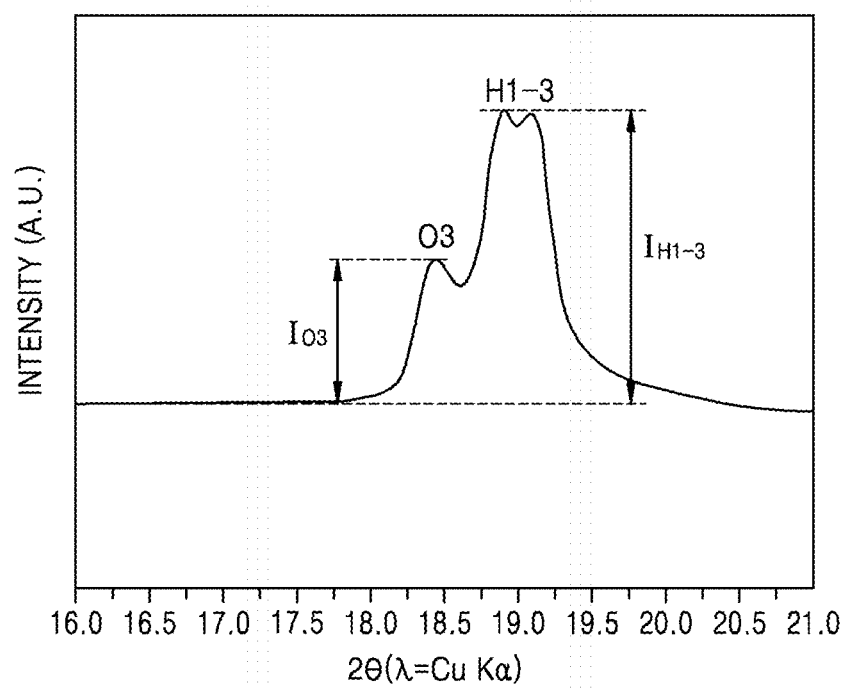
FIG. 16 is an XRD analysis spectrum of the positive active material prepared in Comparative Example 2 according to Evaluation Example 2.

However, as shown in FIGS. 15 and 16, it is found that the positive active materials prepared in Comparative Examples 1 and 2 have a peak intensity of the O3 phase that is less than a peak intensity of the H1-3 phase when charged at a high voltage of 4.55 V. Thus, it was found that a phase transition from the O3 phase to the H1-3 phase occurred. In detail, $I_{O3}/I_{H1-3}$ of the positive active material prepared in Comparative Example 1 was 0.65, and $I_{O3}/I_{H1-3}$ of the positive active material prepared in Comparative Example 2 was 0.49.

In this regard, as shown in Table 1 and FIGS. 14 to 16, with the compositions of the positive active materials manufactured in Examples, the positive materials suppress a phase transition from the O3 phase to the H1-3 phase, and thus, a lithium secondary battery including the positive active material may have improved ICE at a high temperature, rate characteristics, and lifespan characteristics. Moreover with a composition of the positive active material manufactured in Comparative Example 2 in which a doping amount of Mg is greater than that of Examples 1 and 2, a phase transition from the O3 phase to the H1-3 phase is not suppressed, and thus, the lifespan characteristics degrade at high temperatures. In this regard, it is found that $I_{O3}/I_{H1-3}$ may be used as a parameter to evaluate the structural stability of a positive active material.

Evaluation Example 3: High Temperature Evaluation of Battery and XRD Analysis of Positive Active Material According to Changes in Mn Amounts The lithium secondary batteries manufactured in Examples 2 to 5 and Comparative Examples 1 and 2 are evaluated in the same manner as in Evaluation Example 2, and the results thereof are shown in Table 2 below. Also, CRR of each cycle of Examples 2, 4, and 5 and Comparative Example 1 are shown in FIG. 17.

TABLE 2

|  |  | Comparative Example 1 | Example 3 | Example 4 | Example 2 | Example 5 |
|---|---|---|---|---|---|---|
| positive active material composition | substitution amount of Mg (mole) | — | 0.005 | 0.005 | 0.005 | 0.005 |
|  | substitution amount of Mn (mole) | — | 0.001 | 0.0025 | 0.005 | 0.0075 |
|  | average oxidation number (N) | — | 2.17 | 2.33 | 2.5 | 2.6 |
| 1st cycle | 0.1 C | 229 | 215 | 217 | 215 | 219 |
|  | 0.1 D | 220 | 209 | 211 | 511 | 213 |
|  | ICE (%) | 96 | 97 | 97 | 98 | 97 |
| capacity rate characteristics | 0.2 D | 213 | 204 | 209 | 208 | 209 |
|  | 0.5 D | 206 | 195 | 204 | 203 | 203 |
|  | 1 D | 193 | 183 | 198 | 199 | 197 |
|  | 2 D | 181 | 167 | 190 | 191 | 189 |
|  | 1 D/0.1 D (%) | 88 | 89 | 94 | 94 | 93 |
|  | 2 D/0.2 D (%) | 85 |  | 91 | 92 | 91 |
| cycle characteristics | $1^{st}$ discharge capacity (mAh/g) | 191 | 182 | 198 | 198 | 196 |
|  | 30th discharge capacity (mAh/g) | 171 |  | 192 | 192 | 189 |
|  | 50th discharge capacity (mAh/g) | 161 | 171 | 188 | 189 | 185 |
| CRR | 30th (%) | 90 |  | 97 | 97 | 96 |
|  | 50th (%) | 84 | 94 | 95 | 95 | 94 |

Figure 17:
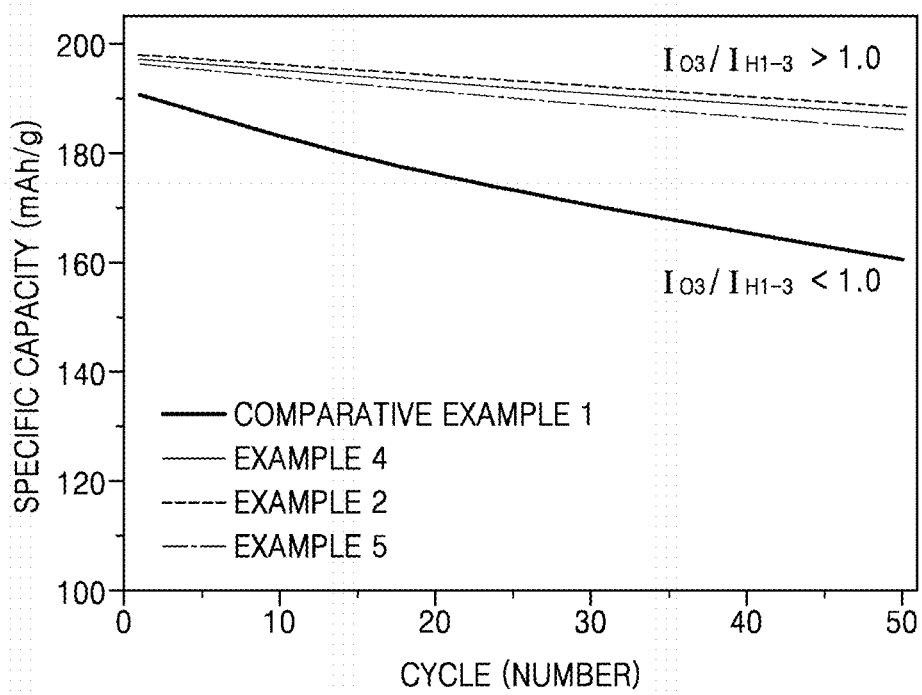
FIG. 17 shows measurement results of specific capacity for each cycle of the lithium secondary batteries manufactured in Examples 2, 4, and 5, and Comparative Example 1 according to Evaluation Example 3.

As shown in Table 2 and FIG. 17, a lithium secondary battery including the positive active material manufactured in Examples 3 to 5 may have improved ICE at a high temperature, rate characteristics, and lifespan characteristics, compared to a lithium secondary battery including $LiCoO_2$. It was also found that lifespan characteristics are improved by an increasing the doping amounts of Mn, but up to a certain level. The result is attributed to the fact that the structural stability of a positive active material is embodied when doping amounts of Mn reaches to an appropriate level.

Figure 14C:
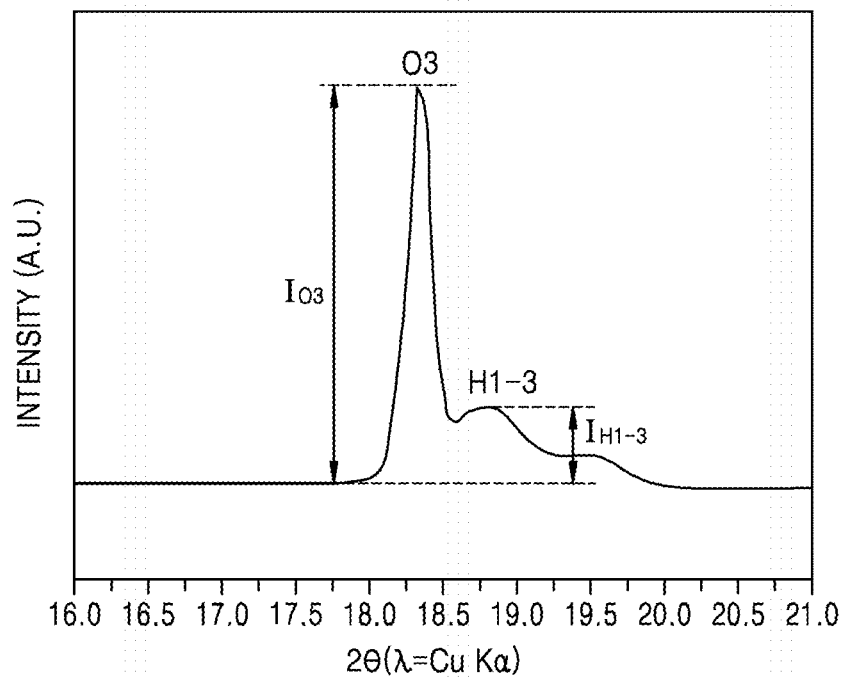
FIGS. 14C to 14E are respective XRD analysis spectrums of the positive active materials prepared in Examples 3 to 5 according to Evaluation Example 3.
Figure 14D:
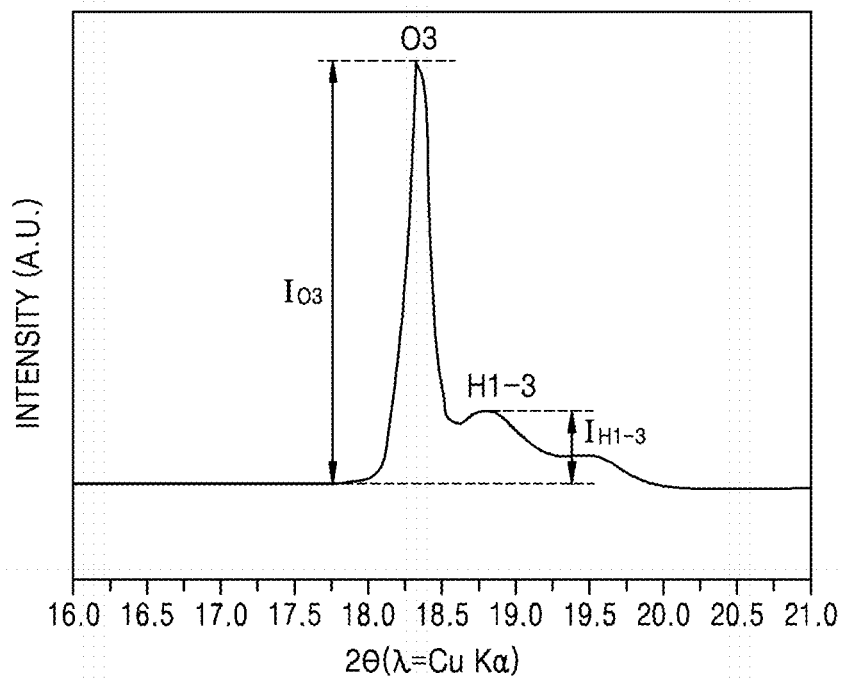
Figure 14E:
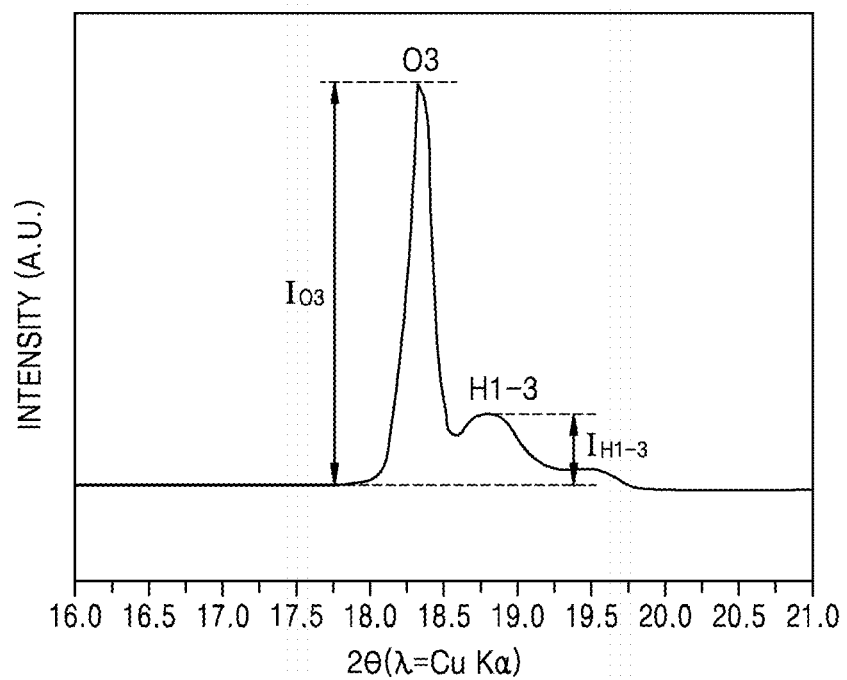

In addition, XRD analysis using Cu-Kα radiation was performed on the positive active material layers that are charged once in a constant current mode after the formation and rating processes and manufactured in Examples 3 to 5 (ex-situ synchrotron analysis, Pohang Accelerator Laboratory (PAL)), and the results thereof are shown in FIGS. 14C to 14E.

As shown in FIGS. 14C to 14E, the positive active materials prepared in Examples 3 to 5 have a peak intensity of the O3 phase that is greater than a peak intensity of the H1-3 phase when charged at a high voltage of 4.55 V. The result is attributed to the fact that a phase transition from the O3 phase to the H1-3 phase in the compositions of the positive active materials manufactured in Examples 3 to 5 was suppressed. In detail, $I_{O3}/I_{H1-3}$ in FIG. 14C was 4.0, $I_{O3}/I_{H1-3}$ in FIG. 14D was 4.7, and $I_{O3}/I_{H1-3}$ in FIG. 14E was 4.4.

Evaluation Example 4: Evaluation of Differential Charge/Discharge Characteristics According to Changes in Mn Amounts The lithium secondary batteries of Examples 2, 4, and 5 and Comparative Example 1 were each charged at a 0.2 C rate to a charging cutoff voltage of 4.55 V in a constant current mode at 25° C., and then, discharged at a 0.2 C rate to a discharging cutoff voltage of 3.0 V in a constant current mode to evaluate initial charge-discharge characteristics of the lithium secondary batteries. Differential capacity (dQ/dv) curves at the first cycle are shown in FIG. 18, and a range between 4.40 V and 4.55 V in FIG. 18 is shown magnified in FIG. 19.

Figure 18:
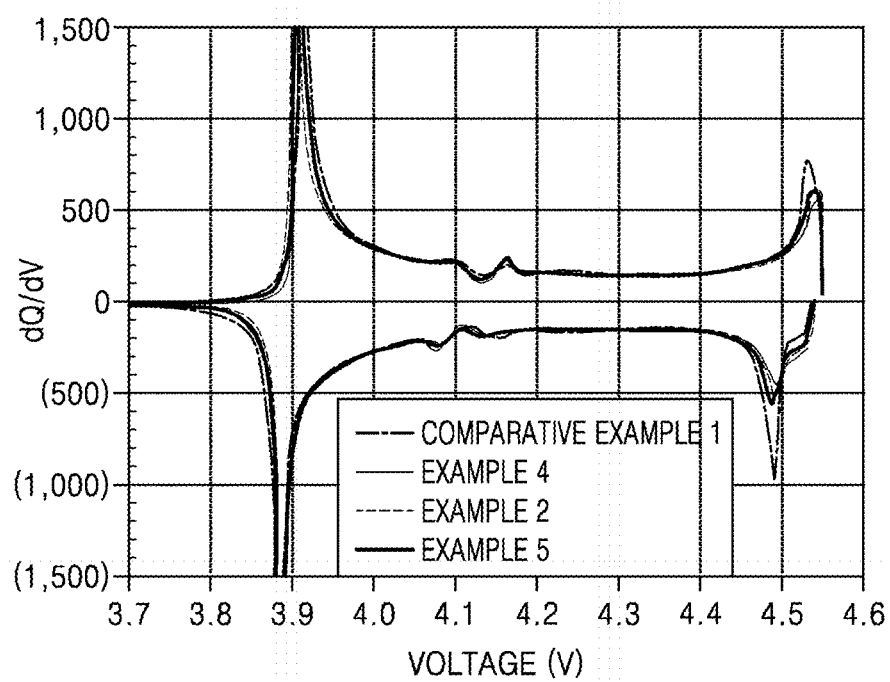
FIG. 18 shows measurement results of dQ/dV with respect to voltages of the lithium secondary batteries manufactured in Examples 2, 4, and 5, and Comparative Example 1 according to Evaluation Example 4.
Figure 19:
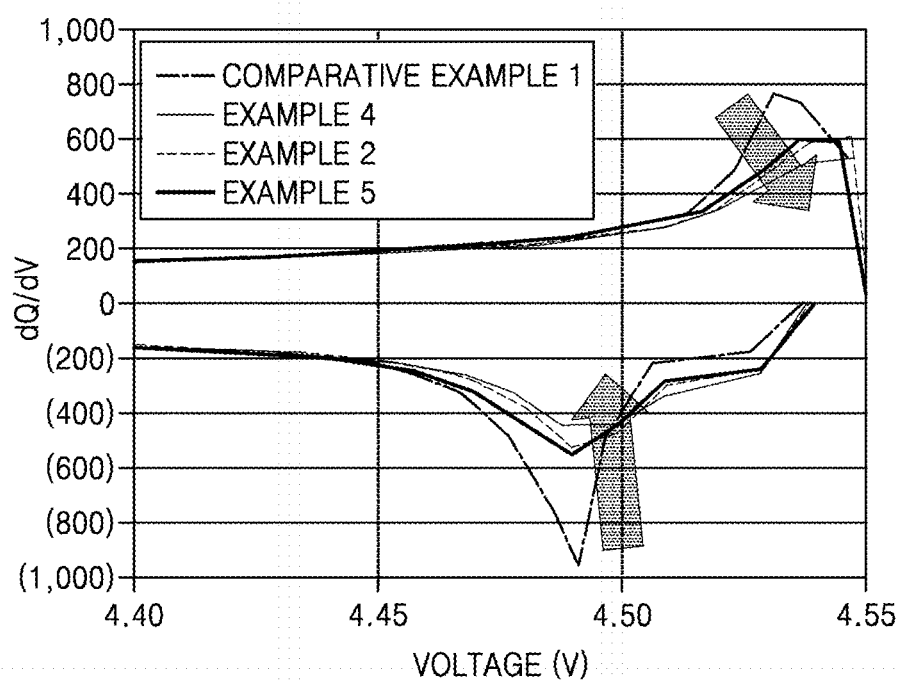
FIG. 19 is an exploded view of a voltage range between 4.40 V to 4.55 V in FIG. 18.

Upper parts of FIGS. 18 and 19 show differential curves when the lithium secondary battery is charged, and lower parts thereof show differential curves when being discharged. As shown in FIG. 19, $LiCoO_2$ is doped with Mn, and thus, a phase transition (from the O3 phase to the H1-3 phase) is suppressed when charged at about 4.53 V, and a phase transition (from the H1-3 to the O3 phase) was suppressed at about 4.49 V.

Evaluation Example 5: Evaluation of High Temperature Characteristics of a Battery According to Changes in Zr Doping Amounts The lithium secondary battery manufactured in Comparative Examples 3 and 4 were evaluated in the same manner as in Evaluation Example 2, and the results thereof are shown in Table 3 below.

TABLE 3

| | | Comparative Example 1 | Comparative Example 3 | Comparative Example 4 |
|---|---|---|---|---|
| positive active material composition | substitution amount of Zr (mole) | — | 0.005 | 0.01 |
| 1st cycle capacity rate characteristic | 0.1 C | 229 | 234 | 234 |
| | 0.1 D | 220 | 226 | 226 |
| | ICE (%) | 96 | 96 | 97 |
| | 0.2 D | 213 | 218 | 220 |
| | 0.5 D | 206 | 210 | 213 |
| | 1 D | 193 | 201 | 206 |
| | 2 D | 181 | 186 | 193 |
| | 1 D/0.1 D (%) | 88 | 89 | 91 |
| | 2 D/0.2 D (%) | 85 | 85 | 87 |
| cycle characteristic | 1st discharge capacity (mAh/g) | 191 | 196 | 201 |
| | 30th discharge capacity (mAh/g) | 171 | 136 | 139 |
| | 50th discharge capacity (mAh/g) | 161 | 98 | 103 |
| CRR | 30th (%) | 90 | 69 | 69 |
| | 50th (%) | 84 | 50 | 51 |

As shown in Table 3, it is found that ICE at a high temperature, rate characteristics, and lifespan characteristics of the lithium secondary battery including LiCoO$_2$ doped with Zr (Comparative Examples 3 and 4) degraded compared to those of the lithium secondary battery including LiCoO$_2$ (Comparative Example 1). It is also found that ICE at a high temperature, rate characteristics, and lifespan characteristics of the lithium secondary battery including LiCoO$_2$ doped with 0.01 mol of Zr (Comparative Example 4) significantly degraded compared to those of the lithium secondary battery including LiCoO$_2$ doped with 0.01 mol of Mg and Mn (Example 2).

Evaluation Example 6: XRD Analysis of Positive Active Material According to Changes in Doping Amounts of Zr and W XRD analysis using Cu-Kα radiation (X'Pert$^3$ Powder, PANalytical, California, USA) was respectively performed on the positive active materials manufactured in Comparative Examples 3 to 8, and the results thereof are shown in FIGS. 20 and 21.

Figure 20:
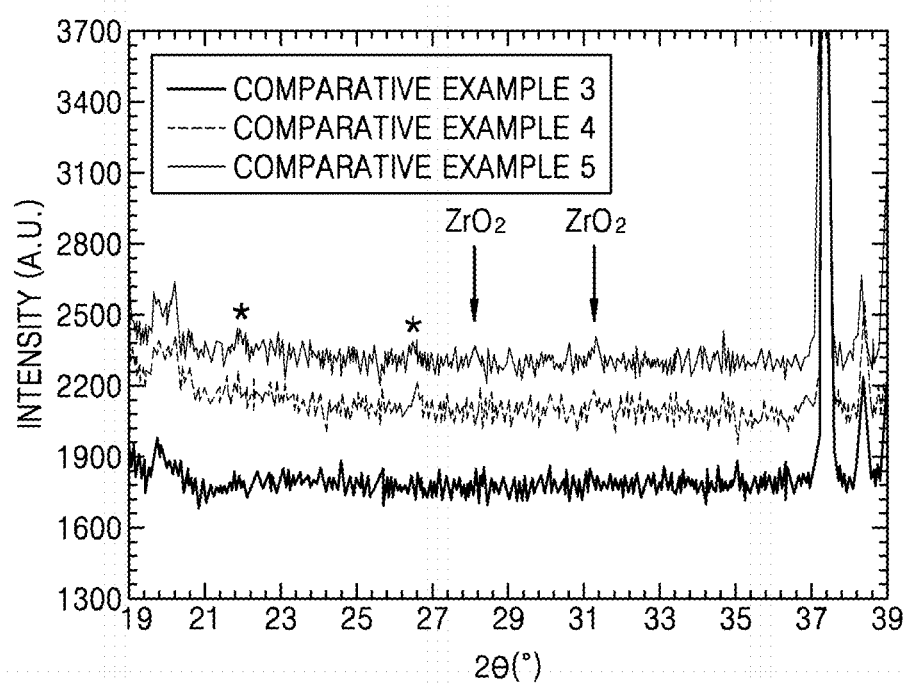
FIG. 20 shows XRD analysis spectrums of the positive active materials prepared in Comparative Examples 3 to 5 according to Evaluation Example 5.
Figure 21:
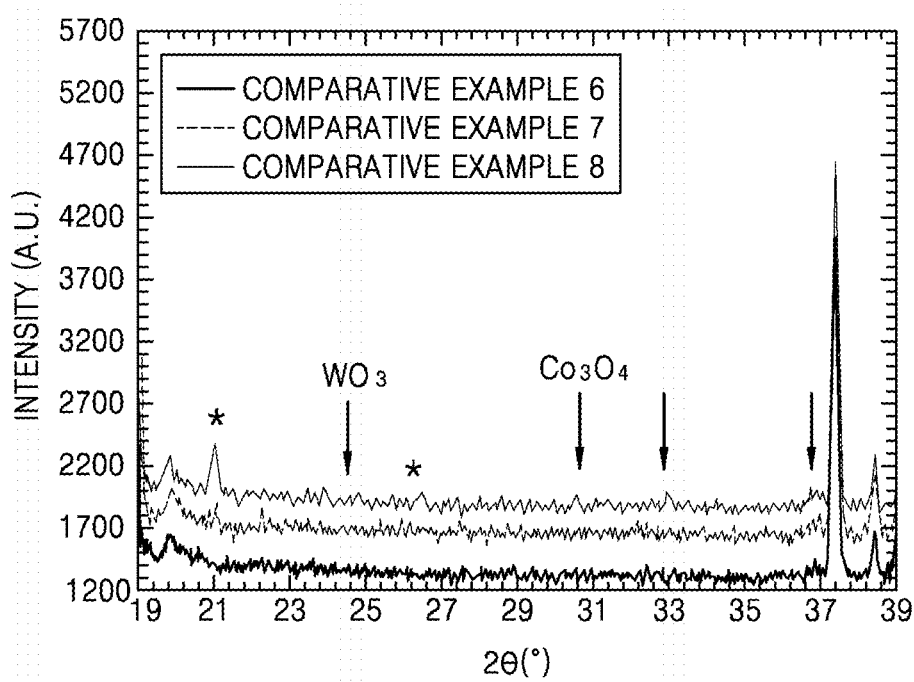
FIG. 21 shows XRD analysis spectrums of the positive active materials prepared in Comparative Examples 6 to 8 according to Evaluation Example 5.

FIG. 20 shows that LiCoO$_2$ doped with Zr has ZrO$_2$ and a minor phase that is not present in LiCoO$_2$ (the latter is denoted as *). Also, FIG. 21 shows that LiCoO$_2$ doped with W has WO$_3$, CO$_3$O$_4$, and a minor phase that is not present in LiCoO$_2$ (the latter is denoted as *).

In this regard, based on the presence of the minor phase, the results are attributed to the fact that LiCoO$_2$ is not doped with Zr and W and in detail, Zr and W did not replace the Co in a crystal lattice of LiCoO$_2$. Therefore, lifespan characteristics and the like of a lithium secondary battery including the positive active materials manufactured in Comparative Examples 3 to 8 degrade.

As described above, according to the one or more of the above exemplary embodiments, the positive active material includes lithium cobalt oxide containing a metal element suppressing a phase transition to the H1-3 phase by which the lifespan characteristics of a lithium secondary battery may deteriorate, and thus, the positive active material may have improved structural stability even when charged at high voltage. In this regard, a lithium battery including the positive active material may have improved lifespan characteristics.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

In the present disclosure, the terms "Example," "Comparative Example," "Reference Example" "Manufacture Example," "Comparative Manufacture Example," "Reference Manufacture Example" and "Evaluation Example" are used arbitrarily to simply identify a particular example or experimentation and should not be interpreted as admission of prior art. While one or more exemplary embodiments have been described with reference to the figures, it will be understood by those of ordinary skill in the art that various changes in form and details may be made therein without departing from the spirit and scope as defined by the following claims.

What is claimed is:

1. A positive active material for a lithium secondary battery, the positive active material comprising:
   a lithium cobalt oxide containing a metal element,
   wherein the lithium cobalt oxide containing a metal element is represented by Formula 1:

$$Li_a(Co_{1.0-x-y}Mg_xMn_y)O_2 \quad \text{Formula 1}$$

wherein, in Formula 1,
   $0.8 \leq a \leq 1.2$, $0.0025 \leq x \leq 0.005$, and $0.0025 \leq y \leq 0.0075$,
   wherein the lithium cobalt oxide containing a metal element has a ratio of a peak intensity of an O3 phase to a peak intensity of an H1-3 phase, $I_{O3}/I_{H1-3}$, that is greater than 1 in an X-ray diffraction (XRD) analysis spectrum using Cu-Kα radiation, and
   wherein an average particle diameter D50 of the lithium cobalt oxide containing a metal element is in a range of about 8 μm to about 20 μm, and
   the metal element is placed in a site of the cobalt in a crystal lattice of the lithium cobalt oxide.

2. The positive active material of claim 1, wherein the $I_{O3}/I_{H1-3}$ is greater than 1.0 and equal to or less than 5.0.

3. The positive active material of claim 1, wherein the lithium cobalt oxide containing a metal element does not comprise a spinel compound.

4. The positive active material of claim 1, wherein the metal element has an oxidation number of 2 or 3.

5. The positive active material of claim 1, wherein
   the lithium cobalt oxide containing a metal element is
   Li(Co$_{0.995}$Mg$_{0.0025}$Mn$_{0.0025}$)O$_2$,
   Li(Co$_{0.9925}$Mg$_{0.0025}$Mn$_{0.005}$)O$_2$,
   Li(Co$_{0.99}$Mg$_{0.0025}$Mn$_{0.0075}$)O$_2$, or a combination thereof.

6. The positive active material of claim 1, wherein
   an average oxidation number N of a metal element contained in the lithium cobalt oxide is in a range of about 2.1 to about 2.75.

7. The positive active material of claim 1, wherein
   a c-axis lattice parameter of a unit lattice of the lithium cobalt oxide containing a metal element is 14.050 Å or more.

8. A positive electrode for a lithium secondary battery, the positive electrode comprising:
   the positive active material of any one of claim 1.

9. A lithium secondary battery comprising the positive electrode of claim 8.

10. The lithium secondary battery of claim 9, wherein a charging cutoff voltage of the lithium secondary battery is 4.5 V or more.

11. The lithium secondary battery of claim 10, wherein, after charging, the lithium cobalt oxide containing a metal element in the positive electrode has a ratio of a peak intensity of the O3 phase to a peak intensity of the H1-3 phase, $I_{O3}/I_{H1-3}$, that is greater than 1 in an XRD analysis spectrum using Cu-Kα radiation.

12. The lithium secondary battery of claim 10, wherein, the $I_{O3}/I_{H1-3}$ is greater than 1.0 and equal to or less than 5.0.

* * * * *